(12) United States Patent
Jin

(10) Patent No.: US 10,484,673 B2
(45) Date of Patent: Nov. 19, 2019

(54) WEARABLE DEVICE AND METHOD FOR PROVIDING AUGMENTED REALITY INFORMATION

(71) Applicant: Samsung Electronics Co., Ltd, Gyeonggi-do (KR)

(72) Inventor: Youngtae Jin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 14/725,396

(22) Filed: May 29, 2015

(65) Prior Publication Data

US 2015/0358614 A1  Dec. 10, 2015

(30) Foreign Application Priority Data

Jun. 5, 2014 (KR) ........................ 10-2014-0068225

(51) Int. Cl.
*H04N 13/04* (2006.01)
*G06F 3/044* (2006.01)
(Continued)

(52) U.S. Cl.
CPC ......... *H04N 13/339* (2018.05); *G02B 27/017* (2013.01); *G06F 3/011* (2013.01); *G06F 3/017* (2013.01); *G06F 3/03545* (2013.01); *G06F 3/041* (2013.01); *G06F 3/044* (2013.01); *G06T 19/006* (2013.01); *H04N 13/211* (2018.05);
(Continued)

(58) Field of Classification Search
CPC .. H04N 13/0436; H04N 13/021; G06F 3/041; G06F 3/044
See application file for complete search history.

(56) References Cited

U.S. PATENT DOCUMENTS

| 6,771,294 B1 | 8/2004 | Pulli et al. |
| 2003/0046254 A1 | 3/2003 | Ryu et al. |
| (Continued) | | |

FOREIGN PATENT DOCUMENTS

| JP | 2013-0061848 | 4/2013 |
| KR | 1999-0046531 A | 7/1999 |
| (Continued) | | |

OTHER PUBLICATIONS

Supplementary European Search Report dated Jan. 5, 2018 in connection with European Patent Application No. 15 80 2338.

(Continued)

*Primary Examiner* — Mainul Hasan

(57) ABSTRACT

An electronic device includes a camera module configured to capturing an image through a camera module of a wearable device, a transceiver configured to perform a functionally coupling between an electronic device and a wearable device, a display module, and a processor functionally coupled to the camera module and the display module, wherein the processor is configured to transmit the image to the electronic device to generate augmented reality using the captured image through the transceiver, receive the augmented reality on a display module of the wearable device through the transceiver, detect a user's hand gesture through the camera module, and control the display module to display a change of augmented reality information, based on the detected user's hand gesture.

16 Claims, 19 Drawing Sheets

(51) Int. Cl.
  *G02B 27/01* (2006.01)
  *G06F 3/01* (2006.01)
  *G06T 19/00* (2011.01)
  *H04N 13/02* (2006.01)
  *G06F 3/041* (2006.01)
  *G06F 3/0354* (2013.01)
  *H04N 13/339* (2018.01)
  *H04N 13/211* (2018.01)
  *H04N 13/293* (2018.01)
  *H04N 13/296* (2018.01)

(52) U.S. Cl.
  CPC ......... *H04N 13/293* (2018.05); *H04N 13/296* (2018.05); *G02B 2027/0178* (2013.01); *G06F 2203/04101* (2013.01); *G06F 2203/04808* (2013.01)

(56) References Cited

U.S. PATENT DOCUMENTS

| | | |
|---|---|---|
| 2008/0005703 A1 | 1/2008 | Radivojevic et al. |
| 2010/0199232 A1 | 8/2010 | Mistry et al. |
| 2012/0050144 A1 | 3/2012 | Morlock |
| 2012/0056847 A1 | 3/2012 | Milford |
| 2012/0092300 A1 | 4/2012 | Wang et al. |
| 2012/0113223 A1* | 5/2012 | Hilliges ............ G06F 3/00 348/46 |
| 2012/0302289 A1 | 11/2012 | Kang |
| 2013/0142387 A1 | 6/2013 | Gomez et al. |
| 2013/0242262 A1 | 9/2013 | Lewis |
| 2013/0307875 A1 | 11/2013 | Anderson |
| 2014/0225918 A1* | 8/2014 | Mittal ............ G06F 3/017 345/633 |
| 2014/0361988 A1* | 12/2014 | Katz ............ G06F 3/011 345/156 |
| 2015/0187357 A1* | 7/2015 | Xia ............ G06F 1/163 704/275 |

FOREIGN PATENT DOCUMENTS

| | | |
|---|---|---|
| KR | 2002-0069697 A | 9/2002 |
| WO | WO 2008/001202 A2 | 1/2008 |
| WO | 2013/012960 A2 | 1/2013 |
| WO | WO 2013093906 A1 * | 6/2013 ............ G06F 3/011 |
| WO | WO-2013093906 A1 * | 6/2013 ............ G06F 3/011 |
| WO | 2013/119221 A1 | 8/2013 |

OTHER PUBLICATIONS

International Search Report dated Aug. 19, 2015 in connection with International Application No. PCT/KR2015/05387; 3 pages.

* cited by examiner

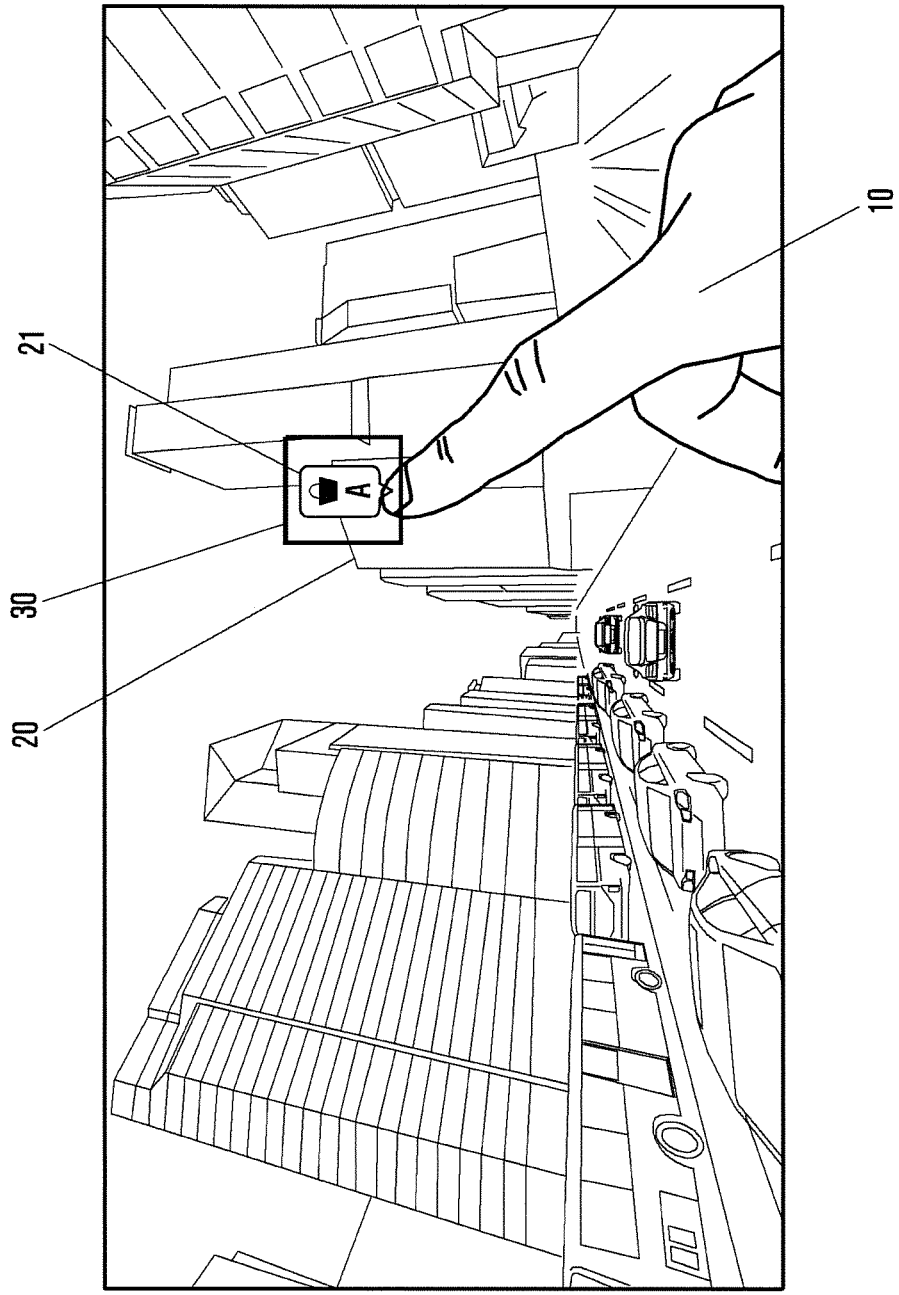

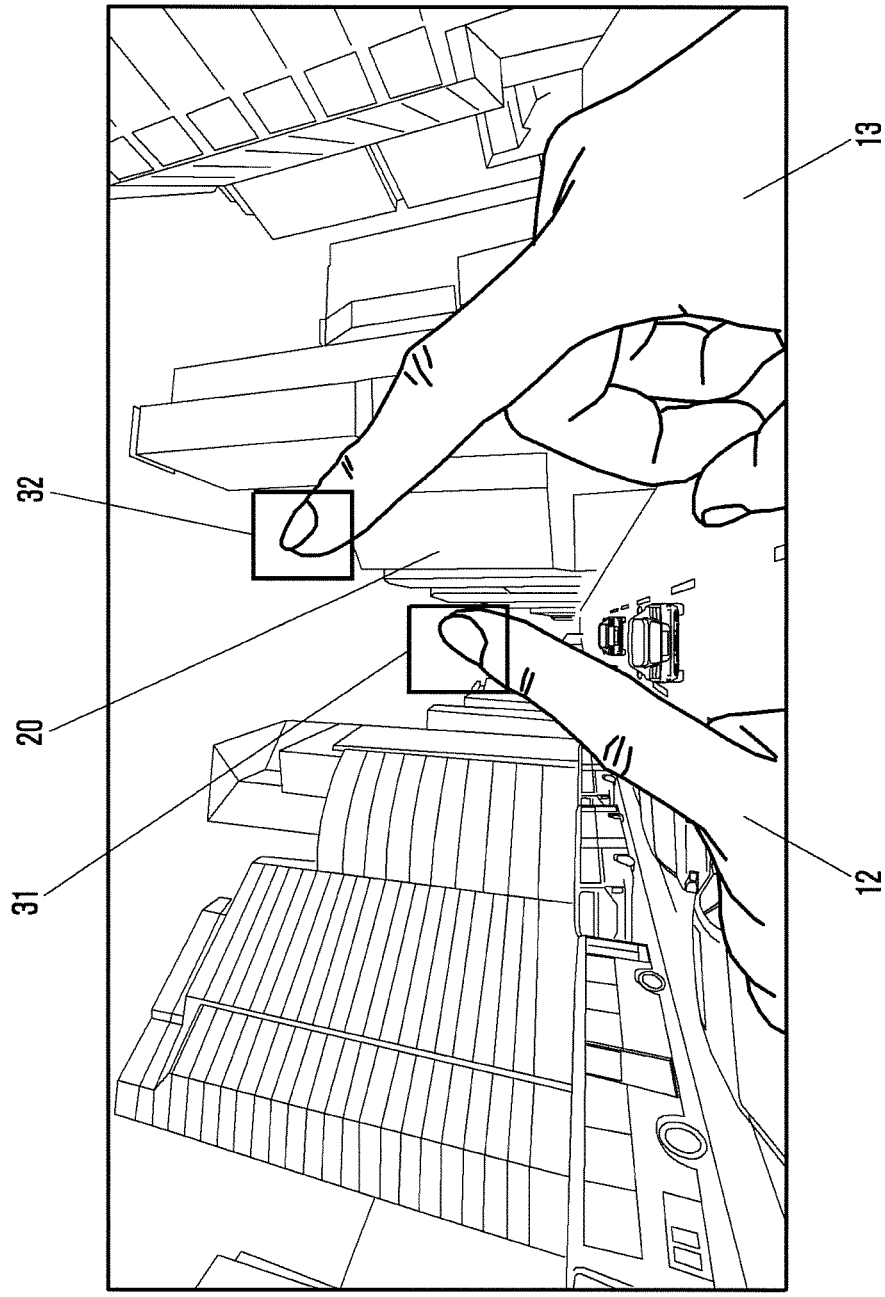

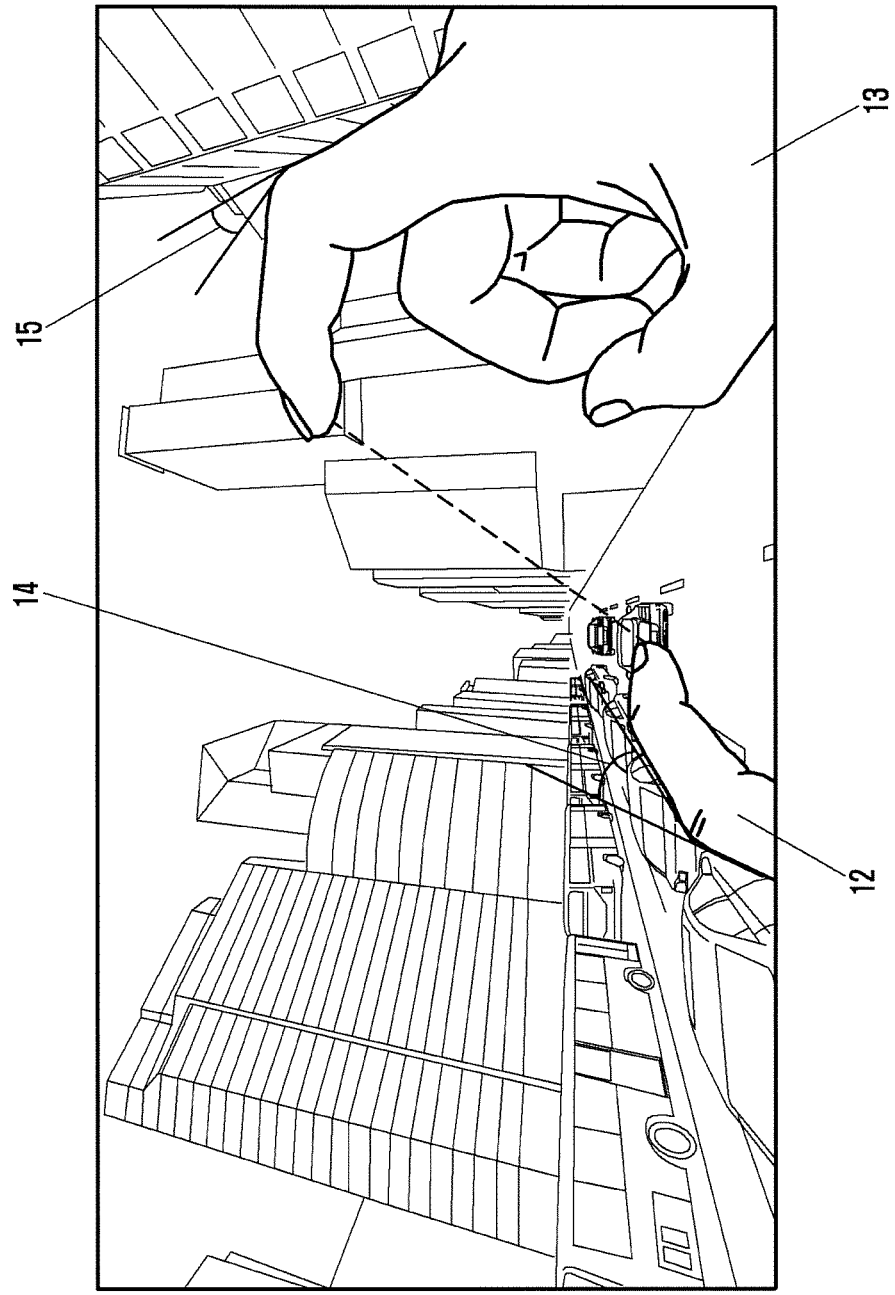

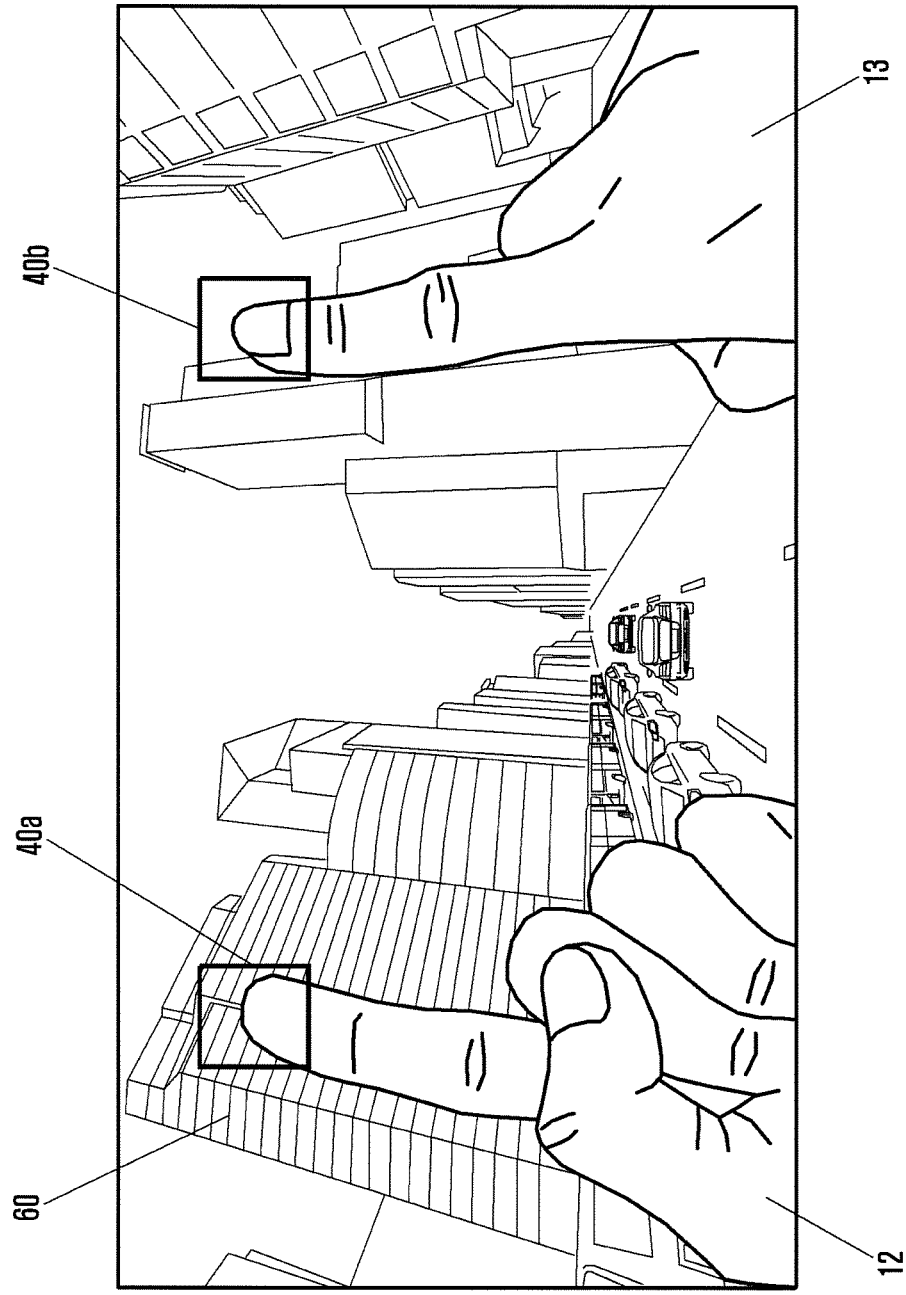

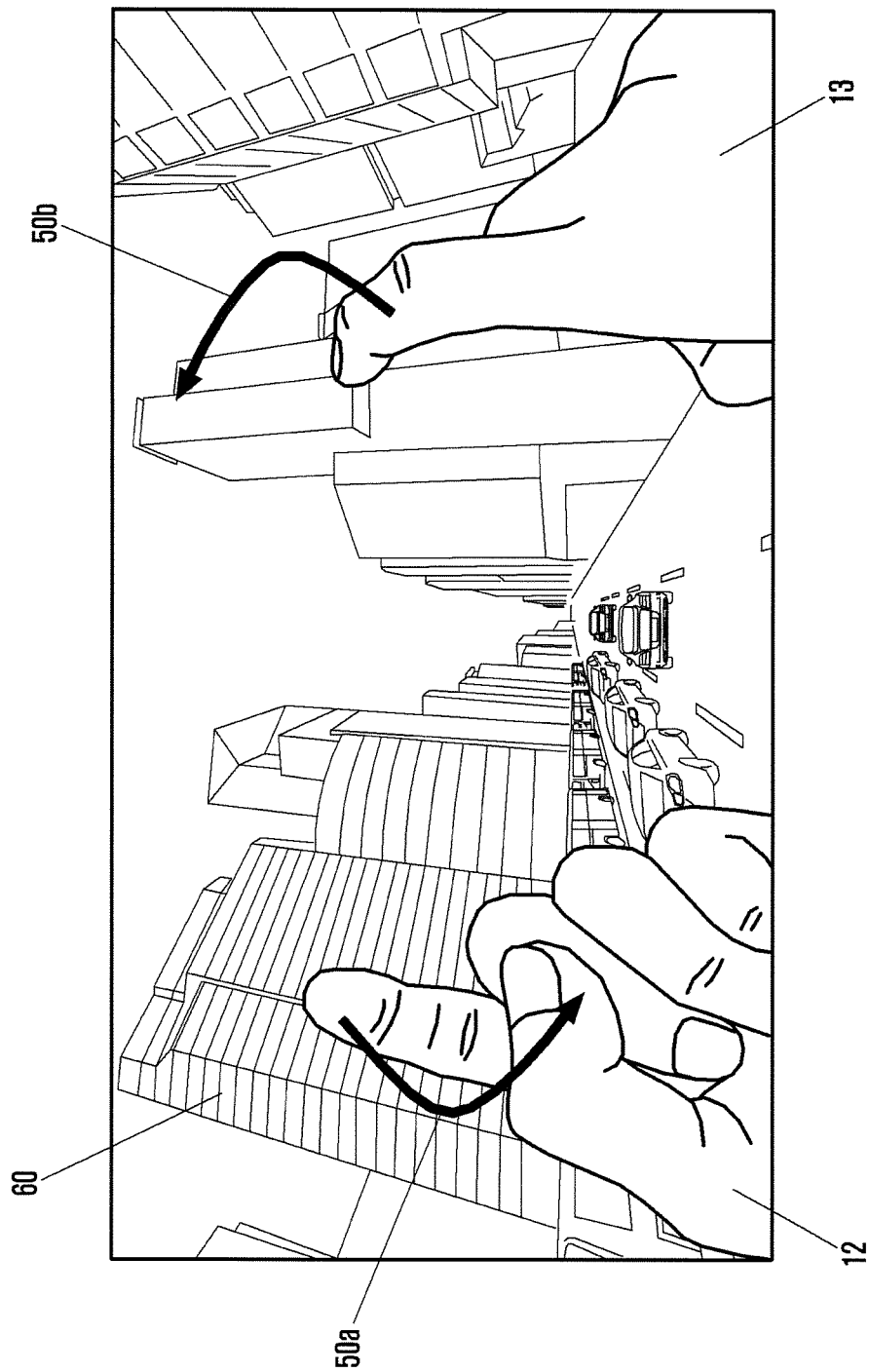

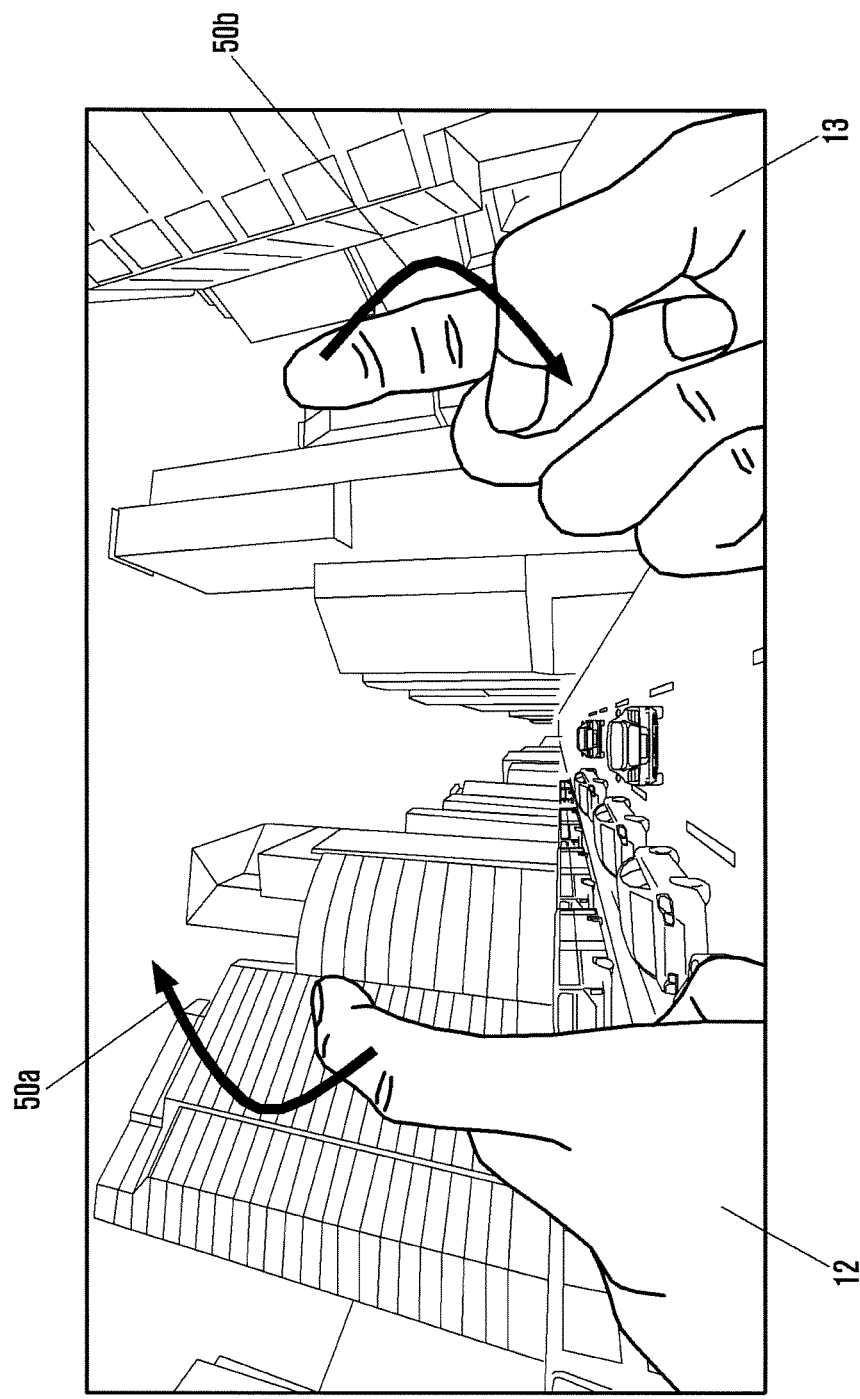

WEARABLE DEVICE AND METHOD FOR PROVIDING AUGMENTED REALITY INFORMATION

CROSS-REFERENCE TO RELATED APPLICATION AND CLAIM OF PRIORITY

The present application is related to and claims benefit under 35 U.S.C. § 119(a) of a Korean patent application filed on Jun. 5, 2014 in the Korean Intellectual Property Office and assigned Serial No. 10-2014-0068225, the entire disclosure of which is hereby incorporated by reference.

TECHNICAL FIELD

The present disclosure relates to a wearable device and method for changing a virtual object contained in augmented reality information by tracking a hand gesture.

BACKGROUND

With a remarkable growth of related technologies, a great variety of mobile electronic devices, e.g., smart phones, tablet PCs (Personal Computers), PMPs (Portable Multimedia Players), PDAs (Personal Digital Assistants), laptop PCs, and wearable devices such as a wrist watch or an HMD (Head Mounted Display), are increasingly popularized due to their high usability and good portability.

Such mobile electronic devices today outgrow their respective traditional fields and hence reach a mobile convergence stage by offering various functions, e.g., an SNS (Social Network Service), a wireless internet access, a multimedia service, an augmented reality information display, etc. as well as an inherent call function.

SUMMARY

To address the above-discussed deficiencies, it is a primary object to provide a wearable device and method for collecting and analyzing a user gesture and thereby changing augmented reality information corresponding to the user gesture.

According to embodiments of the present disclosure, a method for providing augmented reality includes generating augmented reality using an image captured through a camera module of a wearable device, displaying the augmented reality on a display of the wearable device, and in response to the user's finger being bent with respect to a selected object included in the augmented reality, changing the augmented reality and displaying the changed augmented reality on the display of the wearable device.

According to embodiments of the present disclosure, a wearable device includes a camera module, a display module, an a processor functionally coupled to the camera module and the display module, the processor configured to generate augmented reality using an image captured through the camera module, display the augmented reality on the display module, and in response to the user's finger being bent with respect to a selected object included in the augmented reality, change the augmented reality and display the changed augmented reality on the display.

According to embodiments of the present disclosure, a method for providing augmented reality information includes performing a functionally coupling between an electronic device and a wearable device, capturing an image through a camera module of a wearable device, transmitting the image to the electronic device to generate augmented reality using the captured image, receiving and displaying the augmented reality on a display module of the wearable device, detecting a user's hand gesture with respect to a selected object, and displaying a change of the augmented reality information on the display module, based on the detected user's hand gesture.

According to embodiments of the present disclosure, an electronic device includes a camera module configured to capturing an image through a camera module of a wearable device, a transceiver configured to perform a functionally coupling between an electronic device and a wearable device, a display module, and a processor functionally coupled to the camera module and the display module, wherein the processor is configured to transmit the image to the electronic device to generate augmented reality using the captured image through the transceiver, receive the augmented reality on a display module of the wearable device through the transceiver, detect a user's hand gesture through the camera module, and control the display module to display a change of augmented reality information, based on the detected user's hand gesture.

According to embodiments of the present disclosure, a method for providing augmented reality information at a wearable device may include displaying augmented reality information on a functionally coupled display module; determining whether a user's finger is bent in an image collected through a camera module; and if it is determined that the user's finger is bent in the image, displaying a change of the augmented reality information on the display module.

According to embodiments of the present disclosure, a wearable device may include a camera module; a display module; and a processor functionally coupled to the camera module and the display module. The processor may be configured to control the display module to display augmented reality information thereon; determine whether a user's finger is bent in an image collected through the camera module; and if it is determined that the user's finger is bent in the image, display a change of the augmented reality information on the display module.

According to embodiments of the present disclosure, a method for providing augmented reality information at a wearable device may include detecting a user's hand gesture; and displaying a change of the augmented reality information on a display module, based on the detected user's hand gesture.

According to embodiments of the present disclosure, a wearable device may include a camera module; a display module; and a processor functionally coupled to the camera module and the display module. The processor may be configured to detect a user's hand gesture; and control the display module to display a change of augmented reality information, based on the detected user's hand gesture.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A and 6B are diagrams illustrating a method for providing augmented reality information in accordance with an embodiment of the present disclosure.

FIGS. 7A to 7C are diagrams illustrating a method for providing augmented reality information in accordance with an embodiment of the present disclosure.

FIGS. 9A to 9C are diagrams illustrating a method for providing augmented reality information in accordance with an embodiment of the present disclosure.

FIGS. 10A to 10C are diagrams illustrating a method for providing augmented reality information in accordance with an embodiment of the present disclosure.

DETAILED DESCRIPTION

Figure 1:
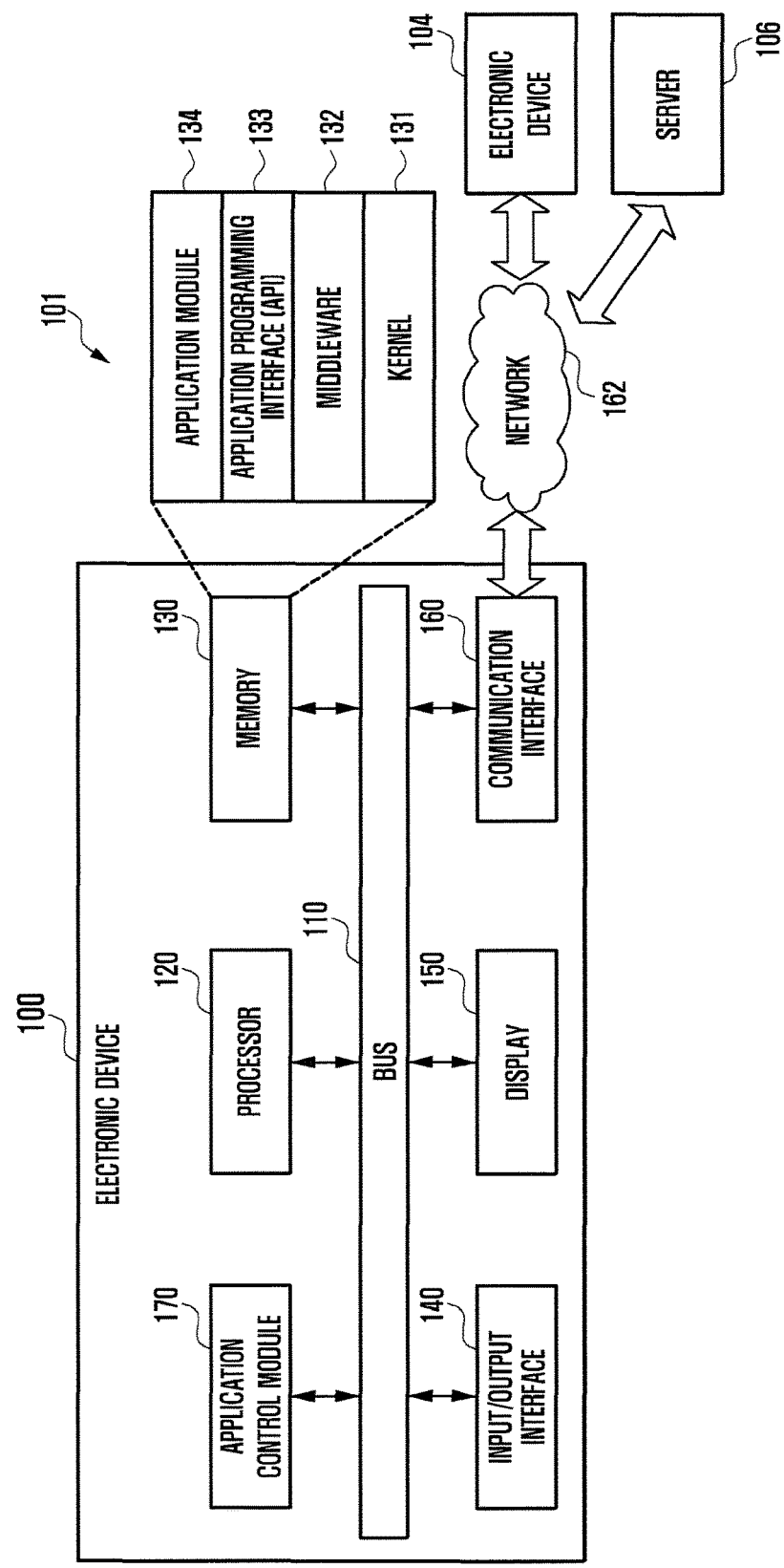
FIG. 1 is a block diagram illustrating a network environment including therein an electronic device in accordance with embodiments of the present disclosure.

FIGS. 1 through 10C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, the present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device may be a smart home appliance having a communication function. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

FIG. 1 illustrates an electronic device 100 according to various embodiments of the present disclosure. Referring to FIG. 1, the electronic device 100 includes a bus 110, a processor 120, a memory 130, an input/output interface 140, a display 150, a communication interface 160, and a application control module 170.

The bus 110 can be a circuit connecting the above described components and transmitting communication (for example, a control message) between the above described components.

The processor 120 receives commands from other components (for example, the memory 130, the input/output interface 140, the display 150, the communication interface 160, or the application control module 170) through the bus 110, analyzes the received commands, and executes calculation or data processing according to the analyzed commands.

The memory 130 stores commands or data received from the processor 120 or other components (for example, the input/output interface 140, the display 150, the communication interface 160, or the application control module 170) or generated by the processor 120 or other components. The memory 130 can include programming modules, for example, a kernel 131, middleware 132, an Application Programming Interface (API) 133, and an application 134. Each of the aforementioned programming modules can be implemented by software, firmware, hardware, or a combination of two or more thereof.

The kernel 131 controls or manages system resources (for example, the bus 110, the processor 120, or the memory 130) used for executing an operation or function implemented by the remaining other programming modules, for example, the middleware 132, the API 133, or the application 134. Further, the kernel 131 provides an interface for accessing individual components of the electronic device 101 from the middleware 132, the API 133, or the application 134 to control or manage the components.

The middleware 132 performs a relay function of allowing the API 133 or the application 134 to communicate with the kernel 131 to exchange data. Further, in operation requests received from the application 134, the middleware 132 performs a control for the operation requests (for example, scheduling or load balancing) by using a method of assigning a priority, by which system resources (for example, the bus 110, the processor 120, the memory 130 and the like) of the electronic device 101 can be used, to the application 134.

The API 133 is an interface by which the application 134 can control a function provided by the kernel 131 or the middleware 132 and includes, for example, at least one interface or function (for example, command) for a file control, a window control, image processing, or a character control.

According to various embodiments, the application 134 can include a Short Message Service (SMS)/Multimedia Messaging Service (MMS) application, an email application, a calendar application, an alarm application, a health care application (for example, application measuring quantity of exercise or blood sugar) or an environment information application (for example, application providing information on barometric pressure, humidity or temperature). Additionally or alternatively, the application 134 can be an application related to an information exchange between the electronic device 101 and an external electronic device (for example, electronic device 104). The application related to the information exchange can include, for example, a notification relay application for transferring particular information to the external electronic device or a device management application for managing the external electronic device.

For example, the notification relay application can include a function of transmitting notification information generated by another application (for example, an SMS/MMS application, an email application, a health care application or an environment information application) of the electronic device 101 to the external electronic device (for example, electronic device 104). Additionally or alternatively, the notification relay application can receive notification information from, for example, the external electronic device 104 and provide the received notification information to the user. The device management application can manage (for example, install, remove, or update) at least a part of functions (for example, turning on/off the external electronic device (or some components of the external electronic device) or controlling a brightness of the display) of the external electronic device (104 communicating with the electronic device 101, an application executed in the external electronic device 104, or a service (for example, call service or message service) provided by the external electronic device 104.

According to various embodiments, the application 134 can include an application designated according to an attribute (for example, type of electronic device) of the external electronic device 104. For example, when the external electronic device 104 is an MP3 player, the application 134 can include an application related to music reproduction. Similarly, when the external electronic device 104 is a mobile medical device, the application 134 can include an application related to health care. According to an embodiment, the application 134 can include at least one of an application designated to the electronic device 101 and an application received from an external electronic device (for example, server 106 or electronic device 104).

The input/output interface 140 transmits a command or data input from the user through an input/output device (for example, a sensor, a keyboard, or a touch screen) to the processor 120, the memory 130, the communication interface 160, or the display control module 170 through, for example, the bus 110. For example, the input/output interface 140 can provide data on a user's touch input through a touch screen to the processor 120. Further, the input/output interface 140 can output a command or data received, through, for example, the bus 110, from the processor 120, the memory 130, the communication interface 160, or the application control module 170 through the input/output device (for example, a speaker or a display). For example, the input/output interface 140 can output voice data processed through the processor 120 to the user through the speaker.

The display 150 displays various pieces of information (for example, multimedia data, text data, or the like) for the user.

The communication interface 160 connects communication between the electronic device 101 and the external device (for example, electronic device 104 or server 106). For example, the communication interface 160 can access a network 162 through wireless or wired communication to communicate with the external device. The wireless communication includes at least one of, for example, WiFi, BlueTooth (BT), Near Field Communication (NFC), a Global Positioning System (GPS), and cellular communication (for example, LTE, LTE-A, CDMA, WCDMA, UMTS, WiBro or GSM). The wired communication can include at least one of, for example, a Universal Serial Bus (USB), a High Definition Multimedia Interface (HDMI), Recommended Standard 232 (RS-232), and a Plain Old Telephone Service (POTS).

According to an embodiment, the network 162 can be a telecommunication network. The telecommunication network includes at least one of a computer network, Internet, Internet of things, and a telephone network. According to an embodiment, a protocol (for example, transport layer protocol, data link layer protocol, or physical layer protocol) for communication between the electronic device 101 and the external device can be supported by at least one of the application 134, the application programming interface 133, the middleware 132, the kernel 131, and the communication interface 160.

According to an embodiment, the server 106 supports driving of the electronic device 101 by performing at least one operation (or function) implemented by the electronic device 101. For example, the server 106 can include a communication control server module 108 that supports the application control module 170 implemented in the electronic device 101. For example, the communication control server module 108 can include at least one of the components of the application control module 170 to perform (on behalf of) at least one operations performed by the application control module 170.

Figure 2:
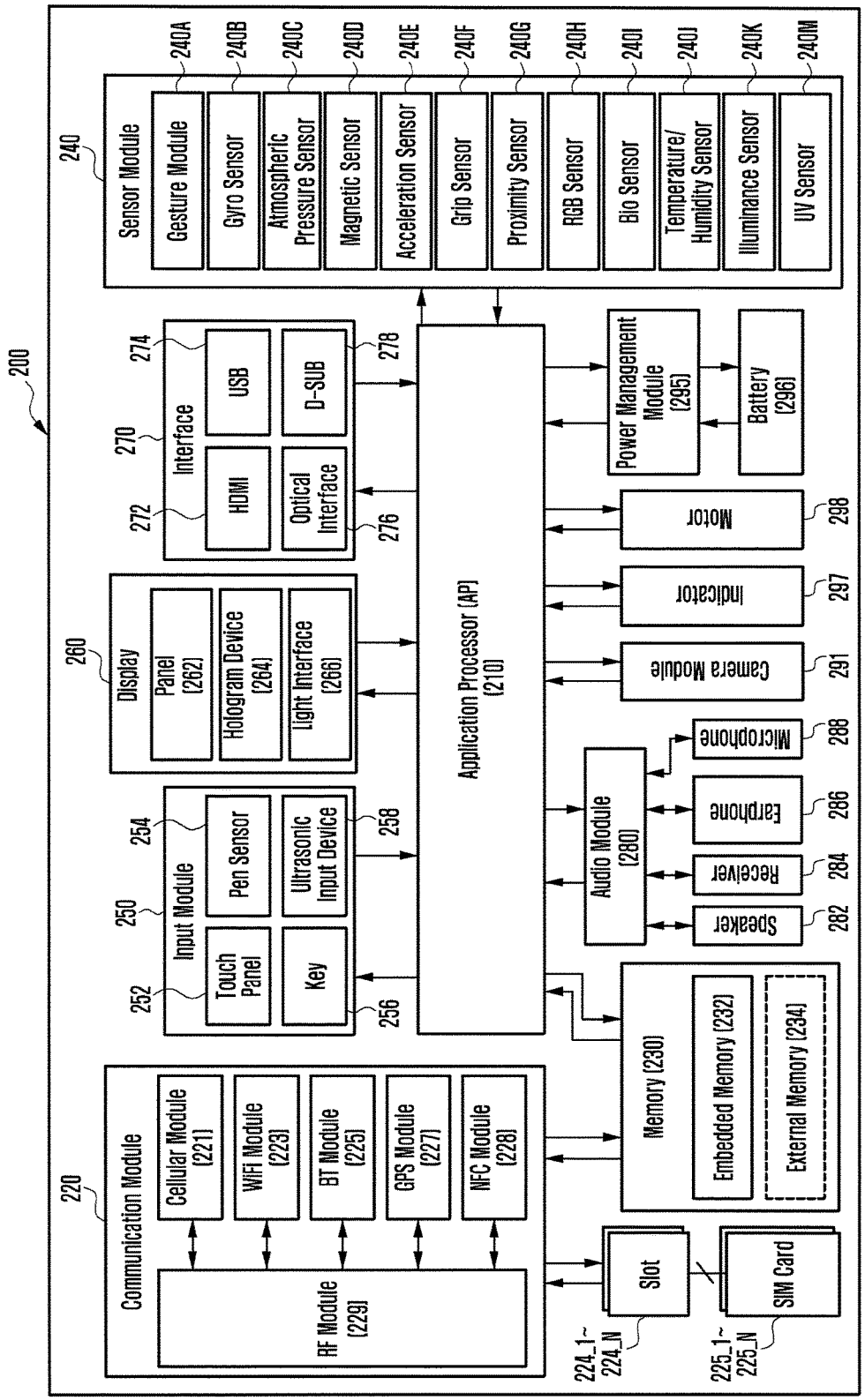
FIG. 2 is a block diagram illustrating an electronic device in accordance with embodiments of the present disclosure.

FIG. 2 is a block diagram 200 of an electronic device 201 according to various embodiments of the present disclosure. The electronic device 201 can configure, for example, a whole or a part of the electronic device 101 illustrated in FIG. 1. Referring to FIG. 2, the electronic device 201 includes one or more Application Processors (APs) 210, a communication module 220, a Subscriber Identification Module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 can be implemented by, for example, a System on Chip (SoC). According to an embodiment, the processor 210 can further include a Graphic Processing Unit (GPU).

The communication module 220 (for example, communication interface 160) transmits/receives data in communication between different electronic devices (for example, the electronic device 104 and the server 106) connected to the electronic device 201 (for example, electronic device 101) through a network. According to an embodiment, the communication module 220 includes a cellular module 221, a WiFi module 223, a BlueTooth (BT) module 225, a Global Positioning System (GPS) module 227, a Near Field Communication (NFC) module 228, and a Radio Frequency (RF) module 229.

The cellular module 221 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 can distinguish and authenticate electronic devices within a communication network by using a subscriber identification module (for example, the SIM card 224). According to an embodiment, the cellular module 221 performs at least some of the functions which can be provided by the AP 210. For example, the cellular module 221 can perform at least some of the multimedia control functions.

According to an embodiment, the cellular module 221 can include a Communication Processor (CP). Further, the cellular module 221 can be implemented by, for example, an SoC.

Although the components such as the cellular module 221 (for example, communication processor), the memory 230, and the power managing module 295 are illustrated as components separate from the AP 210 in FIG. 8, the AP 210 can include at least some (for example, cellular module 221) of the aforementioned components in an embodiment.

According to an embodiment, the AP 210 or the cellular module 221 (for example, communication processor) can load a command or data received from at least one of a non-volatile memory and other components connected to each of the AP 210 and the cellular module 221 to a volatile memory and process the loaded command or data. Further, the AP 210 or the cellular module 221 can store data received from at least one of other components or generated by at least one of other components in a non-volatile memory.

Each of the WiFi module 223, the BT module 225, the GPS module 227, and the NFC module 228 can include, for example, a processor for processing data transmitted/received through the corresponding module. Although the cellular module 221, the WiFi module 223, the BT module 225, the GPS module 227, and the NFC module 228 are illustrated as blocks separate from each other in FIG. 8, at least some (for example, two or more) of the cellular module 221, the WiFi module 223, the BT module 225, the GPS module 227, and the NFC module 228 can be included in one Integrated Chip (IC) or one IC package according to one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 can be implemented by one SoC.

The RF module 229 transmits/receives data, for example, an RF signal. Although not illustrated, the RF module 229 can include, for example, a transceiver, a Power Amp Module (PAM), a frequency filter, a Low Noise Amplifier (LNA) or the like. Further, the RF module 229 can further include a component for transmitting/receiving electronic waves over a free air space in wireless communication, for example, a conductor, a conducting wire, or the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 can transmit/receive an RF signal through a separate RF module according to one embodiment.

The SIM card 224 is a card including a Subscriber Identification Module and can be inserted into a slot formed in a particular portion of the electronic device. The SIM card 224 includes unique identification information (for example, Integrated Circuit Card IDentifier (ICCID)) or subscriber information (for example, International Mobile Subscriber Identity (IMSI).

The memory 230 (for example, memory 130) can include an internal memory 232 or an external memory 234. The internal memory 232 can include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 can be a Solid State Drive (SSD). The external memory 234 can further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 can be functionally connected to the electronic device 201 through various interfaces. According to an embodiment, the electronic device 201 can further include a storage device (or storage medium) such as a hard drive.

The sensor module 240 measures a physical quantity or detects an operation state of the electronic device 201, and converts the measured or detected information to an electronic signal. The sensor module 240 can include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 can include, for example, a E-nose sensor, an electromyography (EMG) sensor, an electroencephalogram (EEG) sensor, an electrocardiogram (ECG) sensor, an Infra-Red (IR) sensor, an iris sensor, a fingerprint sensor (not illustrated), and the like. The sensor module 240 can further include a control circuit for controlling one or more sensors included in the sensor module 240.

The input device 250 includes a touch panel 252, a (digital) pen sensor 254, a key 256, and an ultrasonic input device 258. For example, the touch panel 252 can recognize a touch input in at least one type of a capacitive type, a resistive type, an infrared type, and an acoustic wave type. The touch panel 252 can further include a control circuit. In the capacitive type, the touch panel 252 can recognize proximity as well as a direct touch. The touch panel 252 can further include a tactile layer. In this event, the touch panel 252 provides a tactile reaction to the user.

The (digital) pen sensor 254 can be implemented, for example, using a method identical or similar to a method of receiving a touch input of the user, or using a separate recognition sheet. The key 256 can include, for example, a physical button, an optical key, or a key pad. The ultrasonic input device 258 is a device which can detect an acoustic wave by a microphone (for example, microphone 288) of the electronic device 201 through an input means generating an ultrasonic signal to identify data and can perform wireless recognition. According to an embodiment, the electronic device 201 receives a user input from an external device (for example, computer or server) connected to the electronic device 201 by using the communication module 220.

The display 260 (for example, display 150) includes a panel 262, a hologram device 264, and a projector 266. The panel 262 can be, for example, a Liquid Crystal Display (LCD) or an Active Matrix Organic Light Emitting Diode (AM-OLED). The panel 262 can be implemented to be, for example, flexible, transparent, or wearable. The panel 262 can be configured by the touch panel 252 and one module. The hologram device 264 shows a stereoscopic image in the air by using interference of light. The projector 266 projects light on a screen to display an image. For example, the screen can be located inside or outside the electronic device 201. According to an embodiment, the display 260 can further include a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a D-subminiature (D-sub) 278. The interface 270 can be included in, for example, the communication interface 160 illustrated in FIG. 1. Additionally or alternatively, the interface 290 can include, for example, a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 can be included in, for example, the input/output interface 140 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 can include one or more image sensors (for example, a front sensor or a back sensor), an Image Signal Processor (ISP) (not shown) or a flash (for example, an LED or xenon lamp).

The power managing module 295 manages power of the electronic device 201. Although not illustrated, the power managing module 295 can include, for example, a Power Management Integrated Circuit (PMIC), a charger Integrated Circuit (IC), or a battery or fuel gauge.

The PMIC can be mounted to, for example, an integrated circuit or an SoC semiconductor. A charging method can be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method can include, for example, a magnetic resonance method, a magnetic induction method and an electromagnetic wave method, and additional circuits for wireless charging, for example, circuits such as a coil loop, a resonant circuit, a rectifier or the like can be added.

The battery fuel gauge measures, for example, a remaining quantity of the battery 296, or a voltage, a current, or a temperature during charging. The battery 296 can store or generate electricity and supply power to the electronic device 201 by using the stored or generated electricity. The battery 296 can include a rechargeable battery or a solar battery.

The indicator 297 shows particular statuses of the electronic device 201 or a part (for example, AP 210) of the electronic device 201, for example, a booting status, a message status, a charging status and the like. The motor 298 converts an electrical signal to a mechanical vibration.

Although not illustrated, the electronic device 201 can include a processing unit (for example, GPU) for supporting a module TV. The processing unit for supporting the mobile TV can process, for example, media data according to a standard of Digital Multimedia Broadcasting (DMB), Digital Video Broadcasting (DVB), media flow or the like.

Each of the components of the electronic device according to various embodiments of the present disclosure can be implemented by one or more components and the name of the corresponding component can vary depending on a type of the electronic device. The electronic device according to various embodiments of the present disclosure can include at least one of the above described components, a few of the components can be omitted, or additional components can be further included. Also, some of the components of the electronic device according to various embodiments of the present disclosure can be combined to form a single entity, and thus can equivalently execute functions of the corresponding components before being combined.

Figure 3:
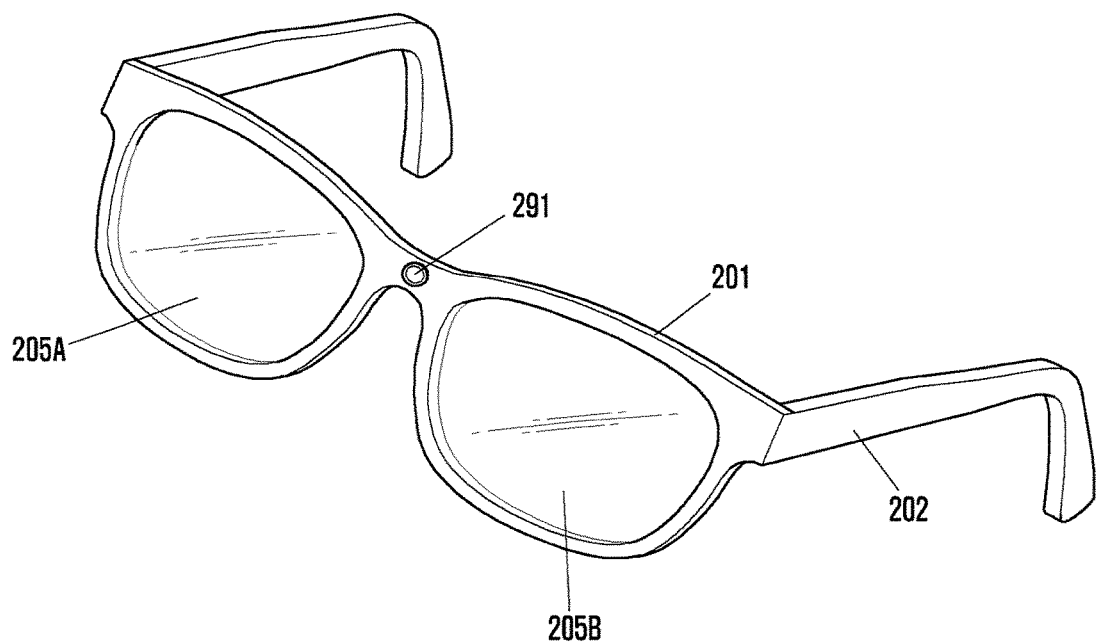
FIG. 3 is a perspective view illustrating a wearable device in accordance with an embodiment of the present disclosure.

FIG. 3 is a perspective view illustrating a wearable device 200 in accordance with an embodiment of the present disclosure.

The wearable device 200 can be, for example, but not limited to, a head-up device (HUD) suitable for wear in the form of glasses or goggles. The wearable device 200 can include a face plate 201 and a supporting part 202. The face plate 201 can be worn on a user's face. The face plate 201 can be supported to a user's face by various members. In one embodiment, the supporting part 202 is combined with the face plate 201 so as to support the face plate 201 to a user's face. The supporting part 202 allows the face plate 201 to be located around user's eyes. Additionally or alternatively, the supporting part 202 can be formed of eyeglass templates, helmets, or straps.

The face plate 201 can have a suitable form or structure for user's wear. For example, the face plate 201 can be configured to cover user's eyes and have a recess placing on a user's nose.

The face plate 201 and/or the supporting part 202 can be formed of wearable and light material such as plastic.

The face plate 201 and/or the supporting part 202 can include internally or externally the application processor (AP) 210, the communication module 220, the subscriber identification module (SIM) card 224, the memory 230, the sensor module 240, the input module 250, the display module 260, the interface 270, the audio module 280, the camera module 291, the power management module 295, the battery 296, the indicator 297, and the motor 298, all of which are discussed earlier in FIG. 2.

The wearable device 200 can include the camera module 291 at the front of the face plate 201. Through the camera module 291, the wearable device 200 can obtain an external image in a user's line of sight. The face plate 201 can include at least one lens 205A and 205B. The lens 205A and 205B can operate as the display module 260. The lens 205A and 205B can be formed of the panel 262, and the wearable device 200 can display an image through the lens 205A and 205B formed of the panel 262. In another embodiment, the wearable device 200 can display an image by projecting light on the lens through the projector 266. The wearable device 200 can obtain a real image through the camera module 291 located in a user's line of sight, analyze the obtained real image, and display augmented reality information corresponding to the analyzed real image on the display module 260.

Figure 4:
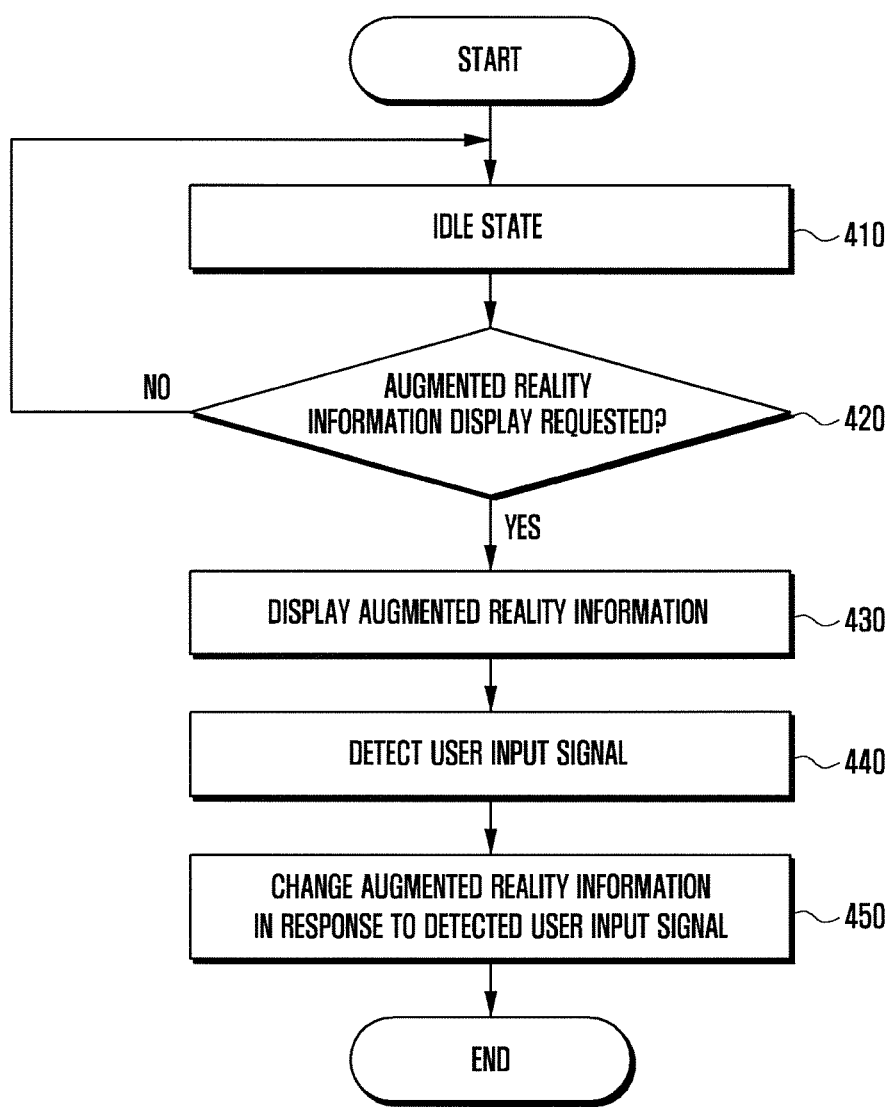
FIG. 4 is a flow diagram illustrating a method for providing augmented reality information in accordance with an embodiment of the present disclosure.

FIG. 4 is a flow diagram illustrating a method for providing augmented reality information in accordance with an embodiment of the present disclosure.

At operation 410, the wearable device 200 operates in an idle state. The processor 120 can control the wearable device 200 to be in an idle state. In this state, the processor 120 can operate in an idle mode or is driving a certain application, program or service.

The electronic device 100 shown in FIG. 1 and the wearable device 200 shown in FIG. 2 can perform the same function. For example, the processor 120 in FIG. 1 can perform the same function as that of the application processor 210 in FIG. 2.

At operation 420, the wearable device 200 determines whether there is a request for a display of augmented reality information. Specifically, the processor 120 can determine whether a user input for requesting a display of augmented reality information is received through the input module 250. Such a user input can be one of a user gesture received through the camera module 291 or the user input module 140, a voice input received through the microphone 288 or the user input module 140, a touch input received through the user input module 140, and a user command or data received through the user input module 140.

The wearable device 200 can detect a user gesture, such as a hand gesture, as a user input for requesting a display of augmented reality information. For example, a user gesture can be a user's action of bending a finger or changing a hand motion. The wearable device 200 can detect a predefined motion of a user's hand or finger. Additionally or alternatively, the wearable device 200 can detect a change of a user's hand or finger more than a predetermined angle. Additionally or alternatively, the wearable device 200 can recognize a user input for requesting a display of augmented reality information when a user's hand or finger remains stationary in a three-dimensional space for a given time.

When specific data corresponding to a request for a display of augmented reality information is received through the communication module 220, the processor 120 can determine that there is a request for a display of augmented reality information. Additionally, the processor 120 can determine whether such a request is received through a program or service offered by the wearable device 200. Additionally, based on a user gesture received through the camera module 291, the processor 120 can determine whether there is such a request. If there is no request for a display of augmented reality information, the wearable device 200 can maintain an idle state. If a predefined motion of a user's hand or finger is detected, or if a change of a user's hand or finger more than a predetermined angle is detected, the wearable device 200 can determine that a request for displaying augmented reality information is received from a user.

If there is the above-discussed request, the wearable device 200, especially the processor 120, can display augmented reality information at operation 430. Also, the processor 120 can control the display module 260 to display augmented reality information combined with an image collected through the camera module 291. For example, the processor 120 analyzes objects contained in a real image collected through the camera module 291 and then selects a target object for providing augmented reality information from among the analyzed objects. The processor 120 can display a virtual object contained in augmented reality information together with such a target object. This virtual object can be an icon or text information associated with the target object, or alternatively an image of a person, a building, a natural object, or the like which exists actually. The wearable device 200 can control the display module 260 to overlay the virtual object on a real image in a user's line of sight. Additionally or alternatively, the wearable device 200 can control the display module 260 to display both the real object and the virtual object in an overlay form. In this case, the wearable device 200 can display transparently or semi-transparently the virtual object on the display module 260 so that the real object can be seen to a user.

Objects to be used as a target object for providing augmented reality information can be, for example, text, a person, a building, a natural object, a barcode, a QR code, a book, a movie poster, and the like. The communication module 220 can establish a communication channel for upload and download of augmented reality information and also support transmission or reception of specific augmented reality information selected by a user.

In order to display augmented reality information, the wearable device 200 can construct a virtual space by collecting objects as background of augmented reality information through the camera module 291 and also arrange augmented reality information in the constructed virtual space. Using the sensor module 240 and/or the communication module 220, the wearable device 200 can support the definition of arrangement of augmented reality information to be arranged in the virtual space. The sensor module 240 and/or the communication module 220 can detect information, e.g., direction, distance, speed, etc., associated with the motion of the wearable device 200. The motion direction can include all directions in the three-dimensional space. The sensor module 240 and/or the communication module 220 can collect information associated with the motion of the wearable device 200, using the gyro sensor 240B and the acceleration sensor 240E, contained in the sensor module 240, and the GPS part module 227. The sensor module 240 and/or the communication module 220 can be automatically activated when a request for a display of augmented reality information is received or when the augmented reality information is displayed. The sensor module 240 and/or the communication module 220 can provide the detected signal to the processor 120. Then, based on the detected signal, the processor 120 can construct a virtual space and determine the arrangement of augmented reality information to be arranged in the virtual space. The background object can be at least one image or graphical element arranged in the virtual space that allows the mapping of augmented reality information. The background object can correspond to a specific part of an image obtained through the camera module 291.

At operation 440, the wearable device 200 can detect a user input signal for requesting a change in augmented reality information. The wearable device 200 can collect an image through the camera module 291. Then, from the collected image, the wearable device 200 can extract a user input signal for requesting a change in augmented reality information. This use input signal can be a user gesture such as a hand gesture. The wearable device 200 can track the hand gesture through the camera module 291, analyze the tracked hand gesture, and offer changed augmented reality information in response to the analyzed gesture. In this case, the wearable device 200 can store in advance a command mapped with the analyzed gesture.

A user input for requesting a change in augmented reality information can be one of a user gesture received through the camera module 291 or the user input module 140, a voice input received through the microphone 288 or the user input module 140, a touch input received through the user input module 140, and a user command or data received through the user input module 140.

The wearable device 200 can detect a user gesture such as a hand gesture. For example, a user gesture can be a user's action of bending a finger or changing a hand motion. The wearable device 200 can detect a predefined motion of a user's hand or finger. Additionally or alternatively, the wearable device 200 can detect a change of a user's hand or finger more than a predetermined angle. Additionally or alternatively, the wearable device 200 can recognize a user input for requesting a display of augmented reality information by detecting such a user gesture, motion, action, or the like.

At operation 450, the wearable device 200 can change the augmented reality information in response to the detected user input signal. The wearable device 200 can change the augmented reality information in response to a predetermined command mapped with the analyzed gesture. According to an embodiment, such a change in the augmented reality information can be displaying detailed information about a target object for providing augmented reality information, displaying a selected virtual object, displaying an enlarged or reduced virtual object, changing a display direction of a virtual object, and the like.

Figure 5:
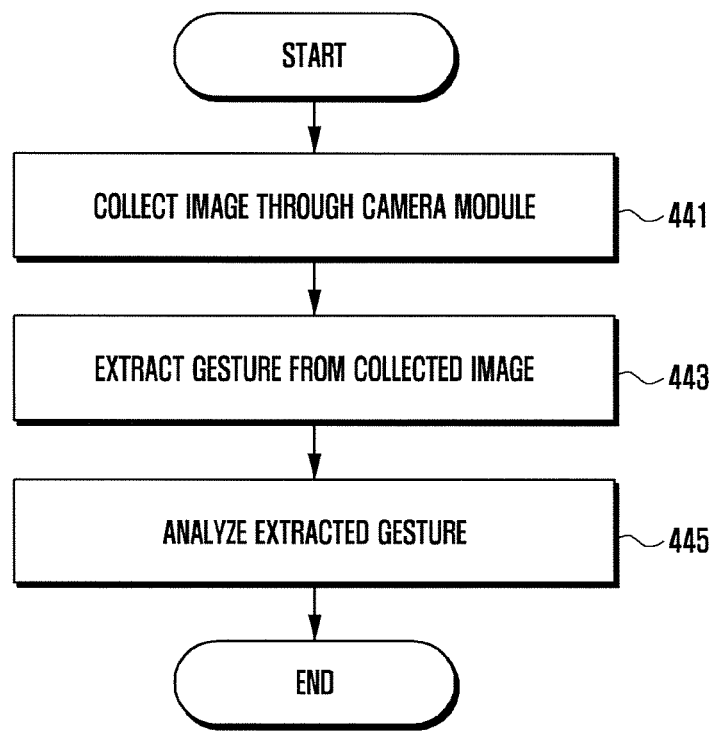
FIG. 5 is a flow diagram illustrating a method for detecting a user input signal in accordance with an embodiment of the present disclosure.

FIG. 5 is a flow diagram illustrating a method for detecting a user input signal in accordance with an embodiment of the present disclosure.

At operation 441, the wearable device 200 collects an image through the camera module 291. At operation 443, the wearable device 200 extracts a user gesture from the collected image. The use gesture can be a hand gesture, and the processor 120 can extract a user's hand gesture from the collected image. At operation 445, the wearable device 200 can analyze the extracted user gesture. The wearable device 200 can store in advance a predetermined command mapped with the analyzed gesture.

The processor 120 can determine whether the extracted user gesture is, for example, a gesture of a request for displaying detailed information about a target object for providing augmented reality information, a gesture of a request for selecting a virtual object, a gesture of a request for enlarging or reducing a virtual object, or a gesture of a request for changing a display direction of a virtual object. For example, if a user's finger indicates a virtual object, the wearable device 200 can determine that this gesture is for selecting a virtual object. For example, if a user's finger is changed to a predetermined angle, the wearable device 200 can determine that this gesture is for requesting detailed information about a virtual object. For example, if two fingers of both hands are changed to a predetermined angle and if both hands are approaching each other, the wearable device 200 can determine that this gesture is for reducing a virtual object. For example, if two fingers of both hands are changed to a predetermined angle and if both hands are being estranged from each other, the wearable device 200 can determine that this gesture is for enlarging a virtual object. For example, if two fingers of both hands are upside down, the wearable device 200 can determine that this gesture is for displaying an air view of a virtual object. For example, if a left hand finger indicates the direction of a user and if a right hand finger indicates the opposite direction of a user, the wearable device 200 can determine that this gesture is for displaying the left of a virtual object. For example, if a right hand finger indicates the direction of a user and if a left hand finger indicates the opposite direction of a user, the wearable device 200 can determine that this gesture is for displaying the right of a virtual object.

Figure 6B:
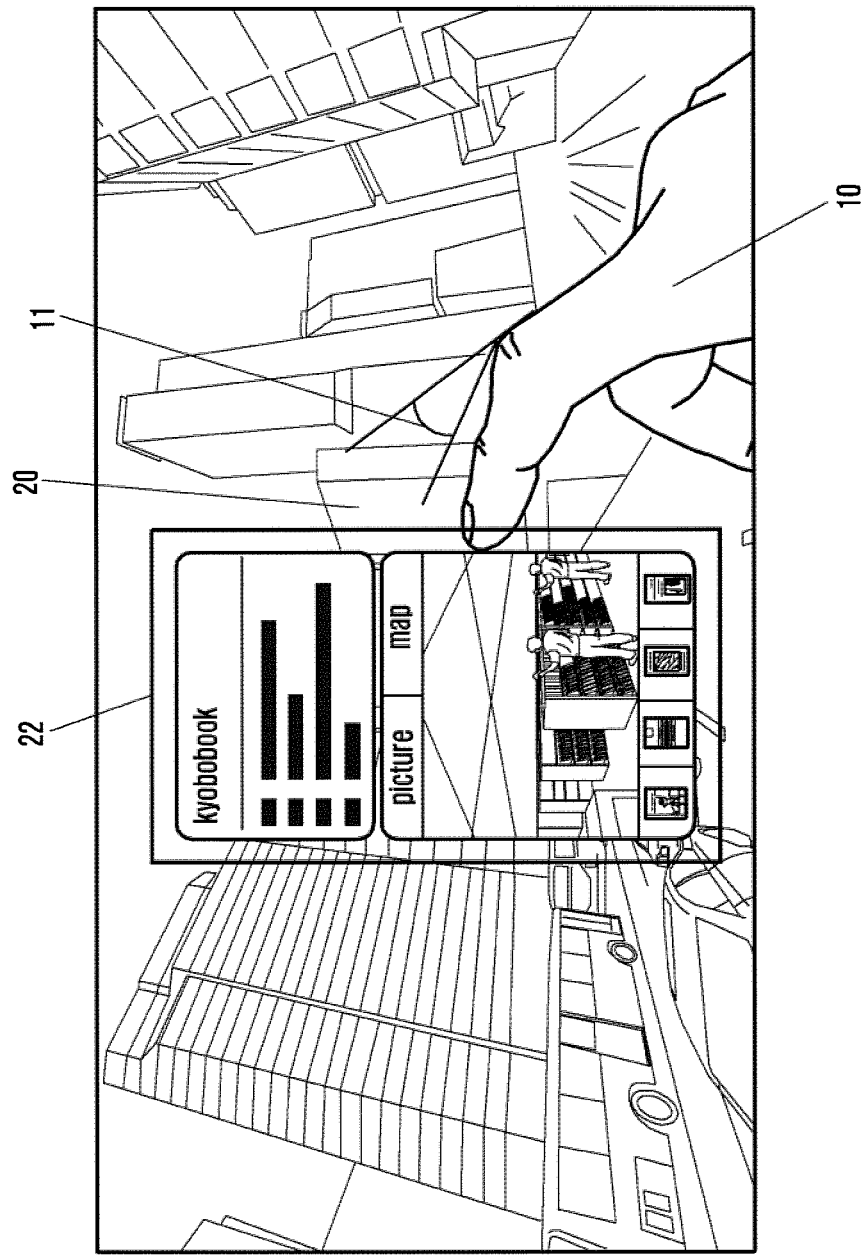

FIGS. 6A and 6B are diagrams illustrating a method for providing augmented reality information in accordance with an embodiment of the present disclosure.

Referring to FIG. 6A, the wearable device 200 can control the display 260 to display at least one type of augmented reality information 20, 21 and 30. The wearable device 200 can display a virtual object which is formed as an image corresponding to an object contained in a real image collected through the camera module 291. For example, if an object contained in a real image collected through the camera module 291 is a building, the wearable device 200 can control the display 260 to display a virtual object 20 formed as a building image. Additionally, the wearable device 200 can control the display 260 to display an icon 21 which identifies an object contained in a real image. This icon 21 can include information associated with the virtual object 20 formed as an image corresponding to an object contained in a real image. For example, if the virtual object 20 formed as an image corresponding to an object contained in a real image is a building and if a bookstore is located in the building, the wearable device 200 can display the icon 21 near the virtual object 20 such that an object contained in a real image can be identified. If a user's finger 10 indicates the virtual object 20 or the icon 21, the wearable device 200 can determine that this gesture is for selecting the virtual object 20 or the icon 21. Then the wearable device 200 can display a window 30, which is an identifier for representing a selection of the virtual object 20 or the icon 21, around the tip of the finger 10.

Referring to FIG. 6B, when the user's finger 10 is bent at an angle 11, the wearable device 200 can detect or track this gesture. If this angle 11 is a predetermined angle or more, the wearable device 200 can determine that this gesture is for requesting detailed information about the virtual object 20 which is a target object for providing augmented reality information. Alternatively, if the user's finger 10 is merely bent regardless of an angle, the wearable device 200 can determine that this gesture is for requesting detailed information about the virtual object 20 as a target object for providing augmented reality information.

In response to the above gesture, the wearable device 200 can control the display 260 to display detailed information 22 about the virtual object 20. For example, if the virtual object 20 which is a target object for providing augmented reality information is a bookstore, detailed information about the bookstore can be displayed including text information such as opening hours, a location, and a phone number, and/or image information such as a photo and a map.

Figure 7B:
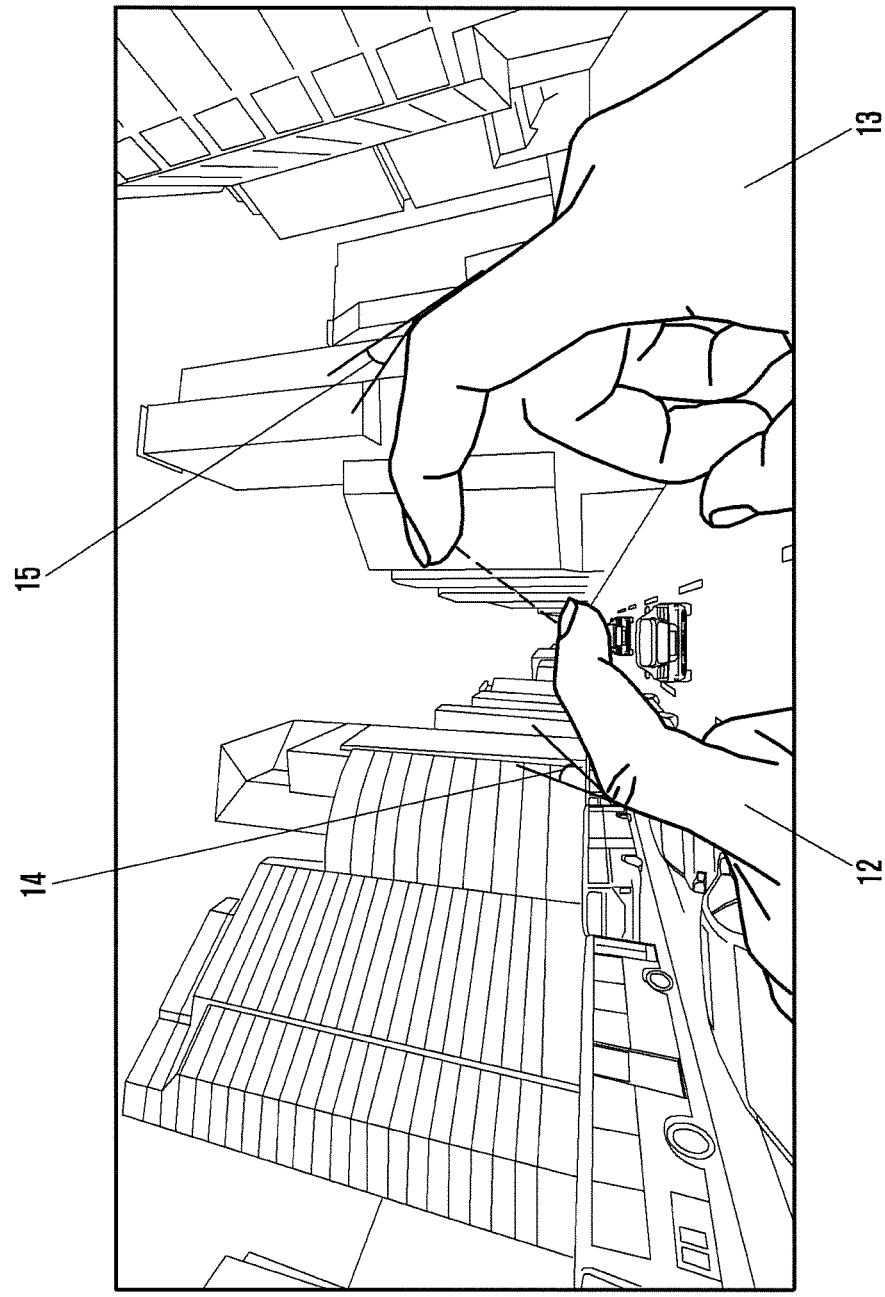

FIGS. 7A to 7C are diagrams illustrating a method for providing augmented reality information in accordance with an embodiment of the present disclosure.

Referring to FIG. 7A, the wearable device 200 can control the display 260 to display at least one type of augmented reality information 20, 31 and 32. The wearable device 200 can display a virtual object which is formed as an image corresponding to an object contained in a real image collected through the camera module 291. For example, if an object contained in a real image collected through the camera module 291 is a building, the wearable device 200 can control the display 260 to display a virtual object 20 formed as a building image. If two fingers of both hands 12 and 13 indicate the virtual object 20, the wearable device 200 can determine that this gesture is for selecting the virtual object 20. Then the wearable device 200 can display windows 31 and 32, which are identifiers for representing a selection of the virtual object 20, around the tip of each finger.

Referring to FIG. 7B, when fingers of both hands 12 and 13 are bent at respective angles 14 and 15 and also when both hands 12 and 13 are approaching each other, the wearable device 200 can detect or track this gesture. If these angles 14 and 15 are predetermined angles or more, the wearable device 200 can determine that this gesture is for reducing the virtual object 20. Alternatively, if two finger tips are merely bent regardless of an angle and approaching each other, the wearable device 200 can determine that this gesture is for reducing the virtual object 20.

In response to the above gesture, the wearable device 200 can control the display 260 to display a reduced size of the virtual object 20. In this case, a reduction ratio can dependent on an approaching ratio or distance between both hands 12 and 13 or finger tips.

Referring to FIG. 7C, when fingers of both hands 12 and 13 are bent at respective angles 14 and 15 and also when both hands 12 and 13 are being estranged from each other, the wearable device 200 can detect or track this gesture. If these angles 14 and 15 are predetermined angles or more, the wearable device 200 can determine that this gesture is for enlarging the virtual object 20. Alternatively, if two finger tips are merely bent regardless of an angle and being estranged from each other, the wearable device 200 can determine that this gesture is for enlarging the virtual object 20.

In response to the above gesture, the wearable device 200 can control the display 260 to display an enlarged size of the virtual object 20. In this case, an enlargement ratio can dependent on an estranged ratio or distance between both hands 12 and 13 or finger tips.

Figure 8A:
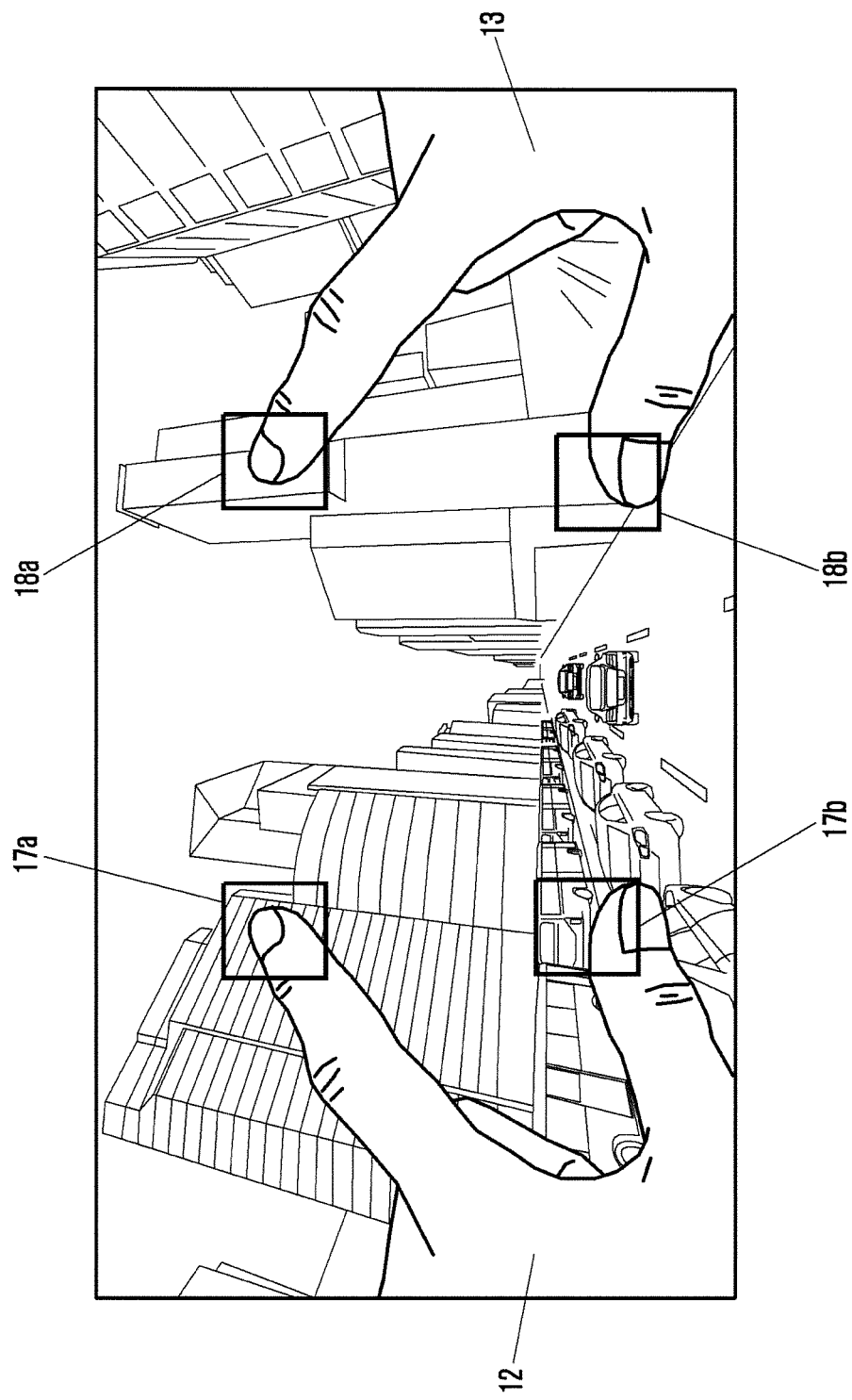
FIGS. 8A to 8C are diagrams illustrating a method for providing augmented reality information in accordance with an embodiment of the present disclosure.
Figure 8B:
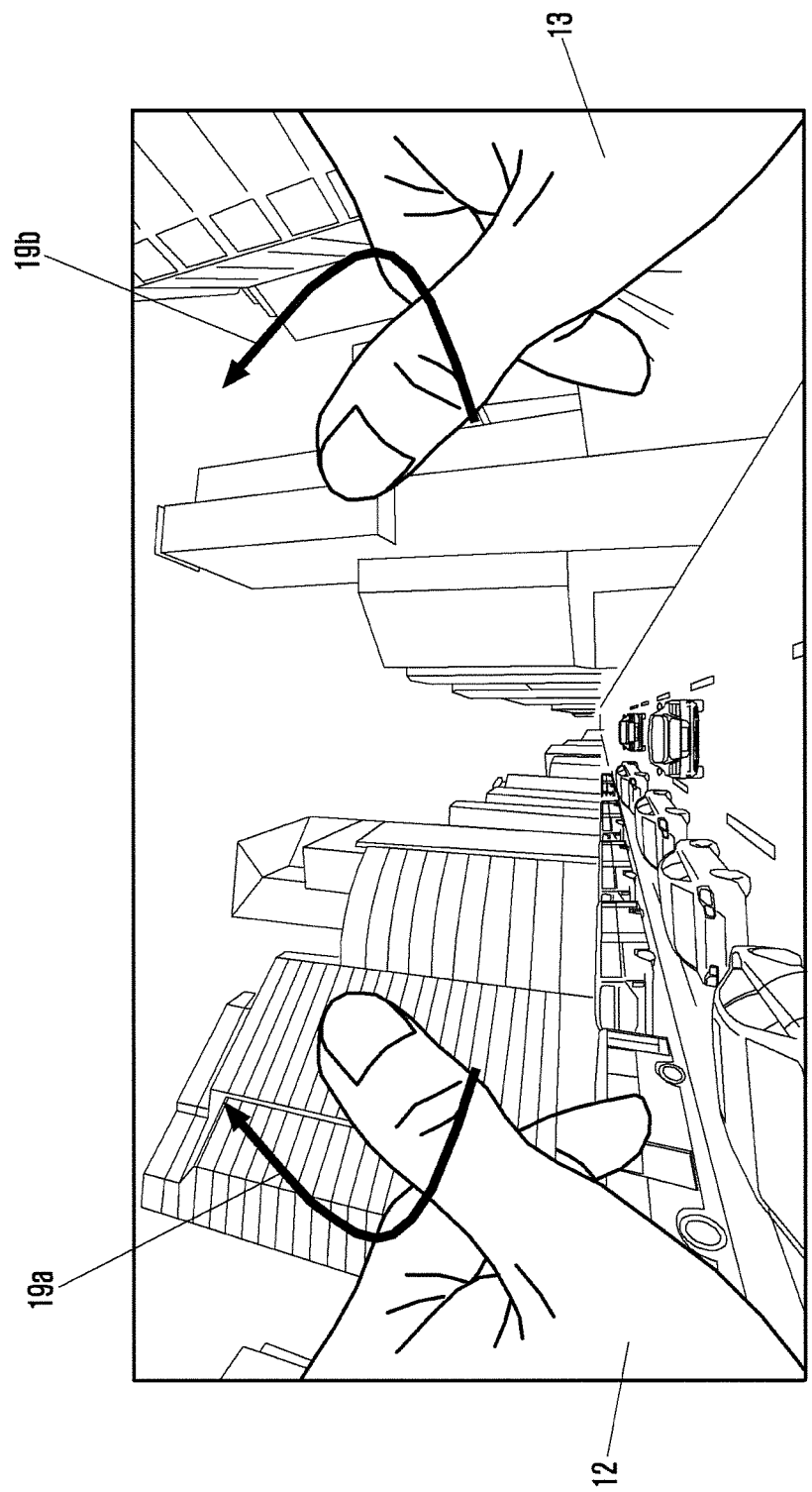
Figure 8C:
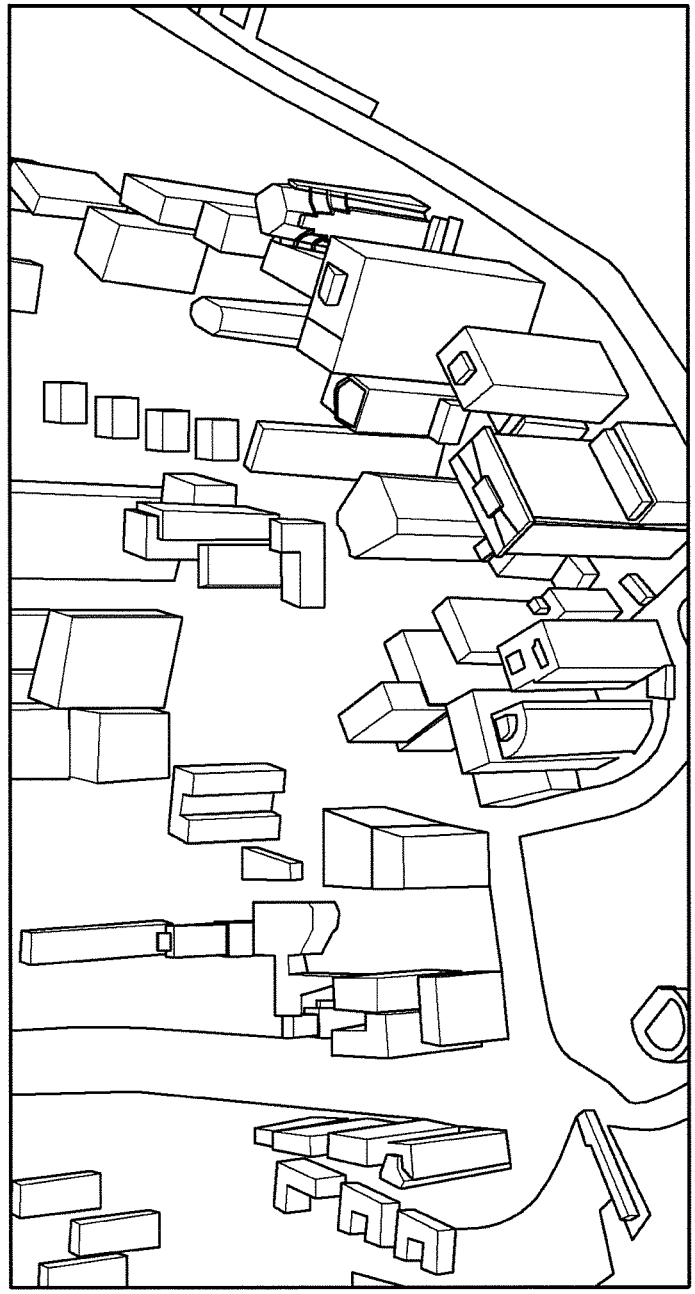

FIGS. 8A to 8C are diagrams illustrating a method for providing augmented reality information in accordance with an embodiment of the present disclosure.

Referring to FIG. 8A, the wearable device 200 can control the display 260 to display at least one type of augmented reality information 17a, 17b, 18a and 18b. The wearable device 200 can display a virtual object which is formed as an image corresponding to an object contained in a real image collected through the camera module 291. For example, if an object contained in a real image collected through the camera module 291 is a building, the wearable device 200 can control the display 260 to display a virtual object formed as a building image. If four fingers of both hands 12 and 13 (e.g., thumb and forefinger of the left hand 12 and thumb and forefinger of the right hand 13) indicate the virtual object, the wearable device 200 can determine that this gesture is for selecting the virtual object. Then the wearable device 200 can display windows 17a, 17b, 18a and 18b, which are identifiers for representing a selection of the virtual object, around the tip of each finger.

Referring to FIG. 8B, when two fingers of each hand 12 and 13 are upside down, the wearable device 200 can detect or track this gesture. Namely, when thumb and forefinger of the left hand 12 are changed in position as shown by a reference number 19a and when thumb and forefinger of the right hand 13 are changed in position as shown by a reference number 19b, the wearable device 200 can recognize it as an upside-down gesture. The wearable device 200 can determine that this gesture is for displaying an air view of the virtual object, and then control the display 260 to display an air view as shown in FIG. 8C.

Figure 9C:
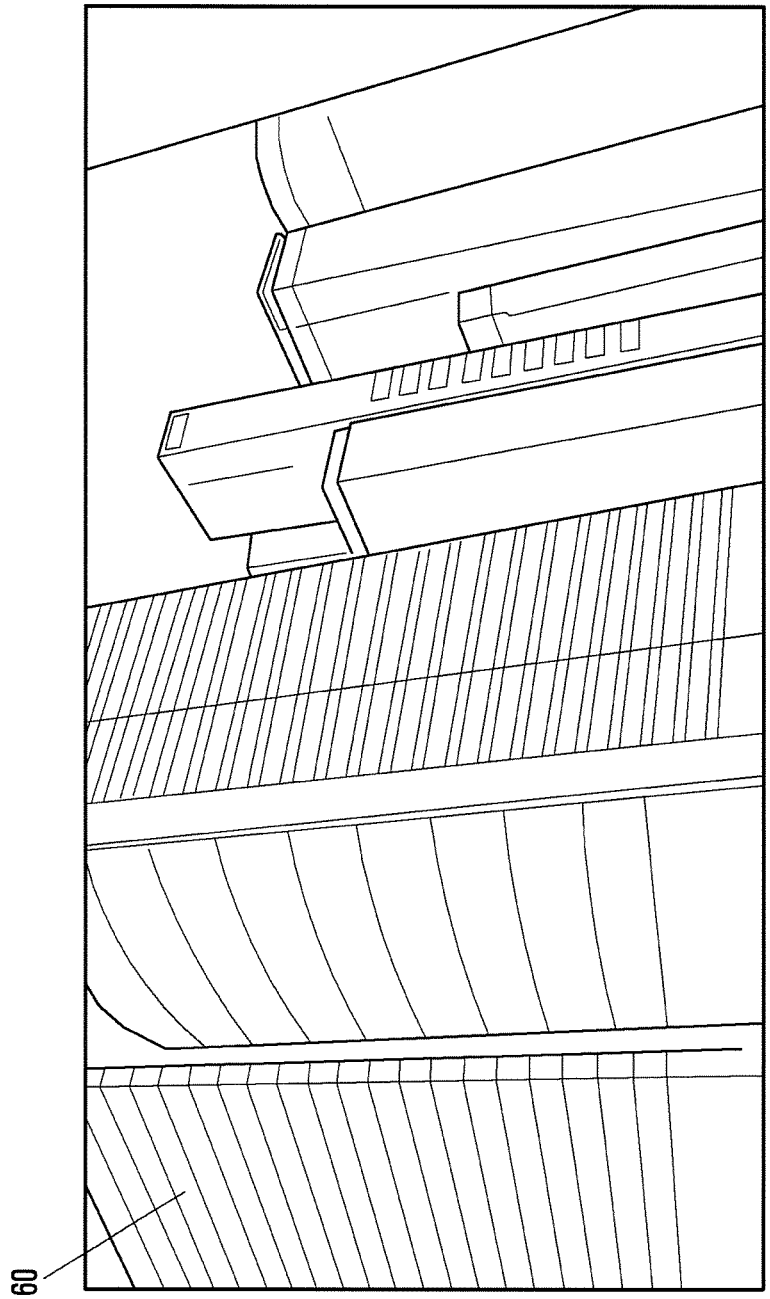

FIGS. 9A to 9C are diagrams illustrating a method for providing augmented reality information in accordance with an embodiment of the present disclosure.

Referring to FIG. 9A, the wearable device 200 can control the display 260 to display at least one type of augmented reality information 40a, 40b and 60. The wearable device 200 can display a virtual object 60 which is formed as an image corresponding to an object contained in a real image collected through the camera module 291. If two fingers of both hands 12 and 13 indicate the virtual object, the wearable device 200 can determine that this gesture is for selecting the virtual object. Then the wearable device 200 can display windows 40a and 40b, which are identifiers for representing a selection of the virtual object, around the tip of each finger.

Referring to FIG. 9B, when two fingers of both hands 12 and 13 are changed in direction as shown by reference numbers 50a and 50b, the wearable device 200 can detect or track this gesture and determine that this gesture is for changing a display direction of the virtual object. For example, if a finger of the left hand 12 indicates the direction of a user and if a finger of the right hand 13 indicates the opposite direction of a user, the wearable device 200 can determine that this gesture is for displaying the left of the virtual object. Then, as shown in FIG. 9C, the wearable device 200 can move a displayed screen on the basis of the virtual object 60 located at the left of the screen.

Figure 10A:
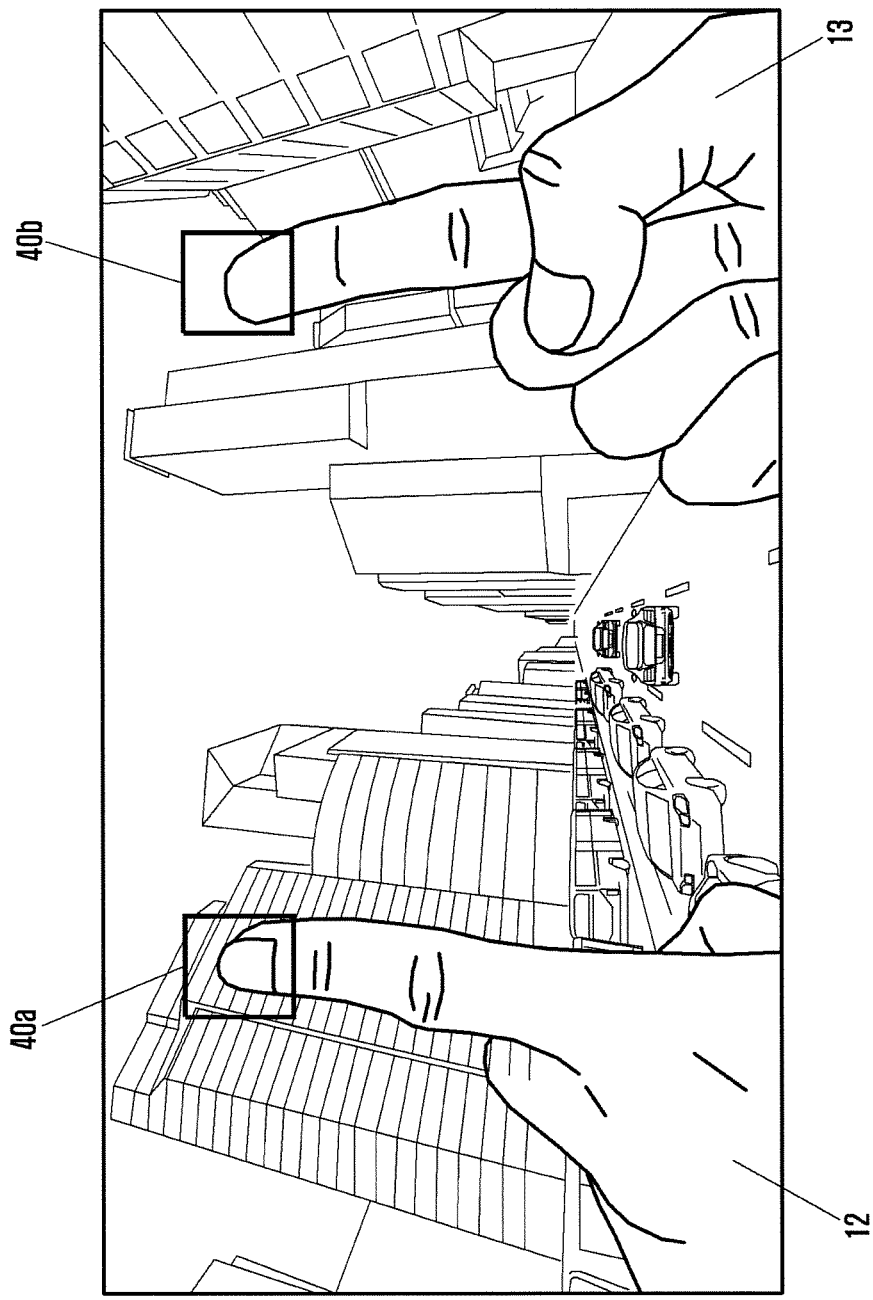
Figure 10C:
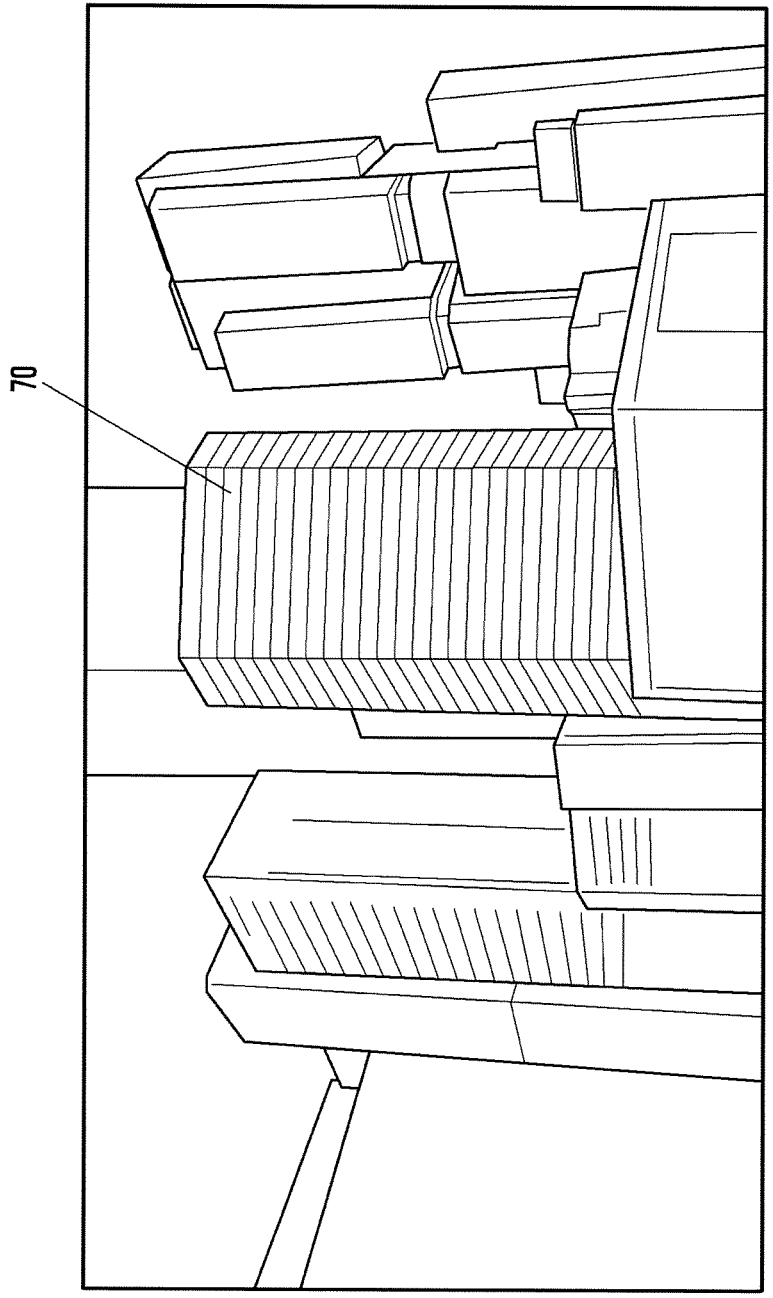

FIGS. 10A to 10C are diagrams illustrating a method for providing augmented reality information in accordance with an embodiment of the present disclosure.

Referring to FIG. 10A, the wearable device 200 can control the display 260 to display at least one type of augmented reality information 40a, 40b and 70. The wearable device 200 can display a virtual object 70 which is formed as an image corresponding to an object contained in a real image collected through the camera module 291. If two fingers of both hands 12 and 13 indicate the virtual object, the wearable device 200 can determine that this gesture is for selecting the virtual object. Then the wearable device 200 can display windows 40a and 40b, which are identifiers for representing a selection of the virtual object, around the tip of each finger.

Referring to FIG. 10B, when two fingers of both hands 12 and 13 are changed in direction as shown by reference numbers 50a and 50b, the wearable device 200 can detect or track this gesture and determine that this gesture is for changing a display direction of the virtual object. For example, if a finger of the left hand 12 indicates the opposite direction of a user and if a finger of the right hand 13 indicates the direction of a user, the wearable device 200 can determine that this gesture is for displaying the right of the virtual object. Then, as shown in FIG. 10C, the wearable device 200 can move a displayed screen on the basis of the virtual object 60 located at the right of the screen.

According to an embodiment, in a computer-readable storage medium which records thereon various commands, the commands are defined to enable at least one processor to perform at least one operation when being executed by the processor. The at least one operation may include, in a method for providing augmented reality information at a wearable device, operations of displaying augmented reality information on a functionally coupled display module; determining whether a user's finger is bent in an image collected through a camera module; and if it is determined that the user's finger is bent in the image, displaying a change of the augmented reality information on the display module.

As fully discussed hereinbefore, the wearable device may provide augmented reality information in response to a user's gesture, thus maximizing a user-friendly interaction between a user and the device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing augmented reality, the method comprising:
   generating augmented reality using an image captured through a camera module of a wearable device, the image comprising a plurality of real objects;
   displaying the augmented reality on a display of the wearable device, the augmented reality including a plurality of virtual objects, wherein each virtual object corresponds to one of a plurality of real objects that are points of interest;
   detecting at least one finger of a user within the augmented reality by the camera module;
   displaying a first window selecting a virtual object corresponding to the real object that is a point of interest, wherein the finger is associated with the first window; and in response to detecting that a finger of the user is bent to at least a predetermined angle, transitioning the first window into a second window different from the first window, displayed on the display of the wearable device, that provides detailed information regarding the real object corresponding to the virtual object.

2. The method of claim 1, further comprising, when the bent finger is moved, displaying a further change of the augmented reality on the display.

3. The method of claim 1, wherein:
detecting at least one finger further comprises detecting at least two fingers of the user within the augmented reality, and
in response to detecting a gestures of the at least two fingers, performing at least one of:
displaying a reduced form of the virtual object,
displaying an enlarged form of the virtual object, or
displaying a moved form of the virtual object.

4. A wearable electronic device comprising:
a camera module;
a display module; and
a processor configured to:
generate augmented reality using an image captured through the camera module;
display the augmented reality on the display module, the augmented reality including a plurality of virtual objects, wherein each virtual object corresponds to one of a plurality of real objects that are points of interest;
detect at least one finger of a user detected within the augmented reality by the camera module;
display a first window selecting a virtual object corresponding to the real object that is a point of interest, wherein the at least one finger is associated with the first window;
detect that a finger, of the at least one detected finger, of the user is bent to at least a predetermined angle; and
in response to detecting that the finger is bent to at least the predetermined angle, transitioning the first window into a second window different from the first window, displayed on the display, that provides detailed information regarding the real object corresponding to the virtual object.

5. The wearable electronic device of claim 4, wherein the processor is further configured to, when the bent finger is moved, control the display module to display a further change of the augmented reality on the display.

6. The wearable electronic device of claim 4, wherein to detect at least one finger of the user, the processor is further configured to:
detect at least two fingers of the user within the augmented reality, and
in response to detecting at least two fingers, control the display to display at least one of:
a reduced form of the virtual object,
an enlarged form of the virtual object, or
a moved form of the virtual object.

7. A method for providing augmented reality information, the method comprising:
establishing a communication channel between an electronic device and a wearable device;
capturing, by the wearable device, an image comprising a plurality of real objects through a camera module of a wearable device;
transmitting, by the wearable device, the image to the electronic device to generate augmented reality using the captured image, the augmented reality including a plurality of virtual objects, wherein each virtual object corresponds to one of a plurality of real objects that are points of interest;
in response to detecting, by the wearable device, at least one finger of a user, transmitting, by the wearable device a location of each of the at least one finger to the electronic device to display a first window selecting a virtual object corresponding to the real object that is a point of interest, wherein the finger is associated with the first window;
receiving and displaying, by the wearable device, the augmented reality on a display module of the wearable device; and
in response to detecting that a finger, of the at least one finger, is being bent to at least a predetermined angle, transitioning the first window into a second window different from the first window, displayed on the display module, that provides detailed information regarding the real object corresponding to the virtual object,
wherein a hand gesture of the user comprises at least one of bending the finger or moving the finger.

8. The method of claim 7, wherein:
detecting at least one finger further comprises detecting at least two fingers of the user within the augmented reality, and
in response to detecting a gesture of the at least two fingers, performing at least one of:
displaying a reduced form of the virtual object,
displaying an enlarged form of the virtual object, or
displaying a moved form of the virtual object.

9. The method of claim 7, wherein displaying the augmented reality includes displaying, transparently or semi-transparently, each of the virtual objects as an overlay on each of the real objects, respectively.

10. A wearable device comprising:
a camera module configured to capturing an image through a camera module of the wearable device;
a transceiver configured to establish a communication channel between an electronic device and the wearable device;
a display module; and
a processor configured to:
transmit the image to the electronic device to generate augmented reality using the captured image through the transceiver, the augmented reality including a plurality of virtual objects, wherein each virtual object corresponds to one of a plurality of real objects that are points of interest;
in response to detecting at least one finger of a user, transmit, through the transceiver, a location of each of the at least one finger to the electronic device to display a first window selecting a virtual object corresponding to the real object that is a point of interest, wherein the finger is associated with the first window;
receive the augmented reality on a display module of the wearable device through the transceiver; and
in response to detecting that a finger, of the at least one finger, is being bent to at least a predetermined angle, control the display module to transition the first window into a second window, different from the first window and displayed on the display module, that provides detailed information regarding the real object corresponding to the virtual object,
wherein a hand gesture of the user comprises at least one of bending the finger or moving the finger.

11. The wearable device of claim 10, wherein to detect at least one finger of the user, the processor is further configured to:
- detect at least two fingers of the user within the augmented reality, and
- in response to detecting at least two fingers, control the display to display at least one of:
  - a reduced form of the virtual object,
  - an enlarged form of the virtual object, or
  - a moved form of the virtual object.

12. The wearable device of claim 10, wherein the processor is further configured to control the display module to display, transparently or semitransparently, each of the virtual objects as an overlay over each of the real objects, respectively.

13. The method of claim 1, wherein the detailed information comprises at least one of a text or an image describing the real object that is associated with the virtual object.

14. The method of claim 1, wherein the virtual object is an icon.

15. The method of claim 1, wherein displaying the first window comprises transposing the window on a location of the virtual object within the augmented reality.

16. The method of claim 1, wherein displaying the first window comprises displaying the first window according to a location of the at least one finger within the augmented reality.

* * * * *